(12) United States Patent  (10) Patent No.: US 8,927,072 B2
Whiteman  (45) Date of Patent: Jan. 6, 2015

(54) PHOTONIC CRYSTAL SECURITY DEVICE

(75) Inventor: Robert Whiteman, Berkshire (GB)

(73) Assignee: De La Rue International Limited, Hampshire (GB)

( * ) Notice: Subject to any disclaimer, the term of this patent is extended or adjusted under 35 U.S.C. 154(b) by 1032 days.

(21) Appl. No.: 12/309,534

(22) PCT Filed: Aug. 10, 2007

(86) PCT No.: PCT/GB2007/003057
§ 371 (c)(1),
(2), (4) Date: Feb. 3, 2009

(87) PCT Pub. No.: WO2008/017864
PCT Pub. Date: Feb. 14, 2008

(65) Prior Publication Data
US 2010/0045027 A1    Feb. 25, 2010

(30) Foreign Application Priority Data

Aug. 10, 2006 (GB) .................... 0615921.4

(51) Int. Cl.
*G02B 1/00* (2006.01)
*B41M 3/14* (2006.01)
(52) U.S. Cl.
USPC ............ 428/29; 283/91; 428/195.1; 428/209; 428/323
(58) Field of Classification Search
CPC  B42D 2035/20; G02F 2202/32; G02B 1/005; B82Y 20/00; B41M 3/148
USPC .................... 283/91; 428/29, 195.1, 209, 323
See application file for complete search history.

(56) References Cited

U.S. PATENT DOCUMENTS

| 1,996,539 | A | | 4/1935 | Dufay |
| 4,186,943 | A | | 2/1980 | Lee |
| 5,639,126 | A | * | 6/1997 | Dames et al. .................. 283/83 |
| 5,783,275 | A | | 7/1998 | Müch et al. |
| 5,898,004 | A | | 4/1999 | Asher et al. |
| 6,036,230 | A | | 3/2000 | Färber |
| 6,337,131 | B1 | | 1/2002 | Rupaner et al. |
| 6,343,745 | B1 | * | 2/2002 | Bohm et al. .................. 235/493 |

(Continued)

FOREIGN PATENT DOCUMENTS

| CA | 2032587 | 7/1996 |
| CA | 2076532 | 12/1998 |

(Continued)

OTHER PUBLICATIONS

Pursiainen et al., "Nanoparticle-tuned structural color from polymer opals," *Optics Express*, vol. 15, No. 15, Jul. 23, 2007, pp. 9553-9561.

(Continued)

*Primary Examiner* — Bruce H Hess
(74) *Attorney, Agent, or Firm* — Oliff PLC

(57) ABSTRACT

An optically variable security device comprises a photonic crystal which, upon receipt of incident light, generates a first optical effect, and which, when the device is subjected-to-an external stimulus, generates a second optical effect that is different from the first optical effect. At least one of the first and second optical effects is an optically variable effect observable over a set of directions. The optically variable effect is caused by the light being selectively reflected or transmitted by the crystal.

62 Claims, 16 Drawing Sheets

(56) References Cited

U.S. PATENT DOCUMENTS

| | | |
|---|---|---|
| 6,946,086 B2 | 9/2005 | Foulger et al. |
| 7,040,663 B1 | 5/2006 | Plaschka et al. |
| 7,068,431 B2* | 6/2006 | Fukshima et al. ............ 359/618 |
| 2003/0031438 A1* | 2/2003 | Kambe et al. ................. 385/122 |
| 2003/0179364 A1* | 9/2003 | Steenblik et al. ............... 356/71 |
| 2003/0206694 A1* | 11/2003 | Babin et al. ..................... 385/31 |
| 2004/0131799 A1 | 7/2004 | Arsenault et al. |
| 2004/0170352 A1* | 9/2004 | Summers et al. ............... 385/16 |
| 2004/0228575 A1* | 11/2004 | Kim et al. ....................... 385/27 |
| 2004/0253443 A1 | 12/2004 | Anselmann et al. |
| 2005/0029800 A1 | 2/2005 | Disano et al. |
| 2005/0224203 A1 | 10/2005 | Boehm et al. |
| 2005/0228072 A1 | 10/2005 | Winkler et al. |

FOREIGN PATENT DOCUMENTS

| | | |
|---|---|---|
| CA | 2163528 | 12/1998 |
| DE | 102 28 228 A1 | 4/2003 |
| EP | 0 059 056 A1 | 9/1982 |
| EP | 0 435 029 A2 | 7/1991 |
| EP | 0 516 790 A1 | 12/1992 |
| EP | 0 723 501 A1 | 4/1995 |
| EP | 0 724 519 A1 | 4/1995 |
| EP | 0 860 298 A2 | 8/1998 |
| EP | 1 141 480 A1 | 10/2001 |
| EP | 1 156 934 A1 | 11/2001 |
| WO | WO 83/00659 A1 | 3/1983 |
| WO | WO 90/02658 A1 | 3/1990 |
| WO | WO 97/19821 A1 | 6/1997 |
| WO | WO 98/20382 A1 | 5/1998 |
| WO | WO 98/25236 A1 | 6/1998 |
| WO | WO 99/28852 A1 | 6/1999 |
| WO | WO 03/054297 A2 | 7/2003 |
| WO | WO 03/061980 A1 | 7/2003 |
| WO | WO 03/062900 A1 | 7/2003 |
| WO | WO 03/091952 A2 | 11/2003 |
| WO | WO 03/091953 A2 | 11/2003 |
| WO | WO 03/095188 A2 | 11/2003 |
| WO | WO 04/001130 A1 | 12/2003 |
| WO | WO 2005/080089 A1 | 9/2005 |
| WO | WO 2006/018094 A1 | 2/2006 |
| WO | WO 2007/079453 A2 | 7/2007 |

OTHER PUBLICATIONS

Arsenault et al., "From colour fingerprinting to the control of photoluminescence in elastic photonic crystals," *Nature Materials*, vol. 5, Mar. 2006, pp. 179-184.

Ruhl et al., "Artificial opals prepared by melt compression," *Polymer*, vol. 44, Sep. 24, 2003, pp. 7625-7634.

Dr. G. Bastian, "Photonische Kristallsensoren", Workshop "Organische Materialien in der optoelektronischen Anwendung", Mar. 10, 2006 (with translation).

Jul. 7, 2011 Office Action issued in U.S. Appl. No. 12/309,535.

May 10, 2012 Office Action issued in U.S. Appl. No. 12/309,535.

U.S. Office Action dated May 16, 2014 from U.S. Appl. No. 12/309,535.

Mar. 4, 2013 Office Action issued in U.S. Appl. No. 12/309,535.

* cited by examiner

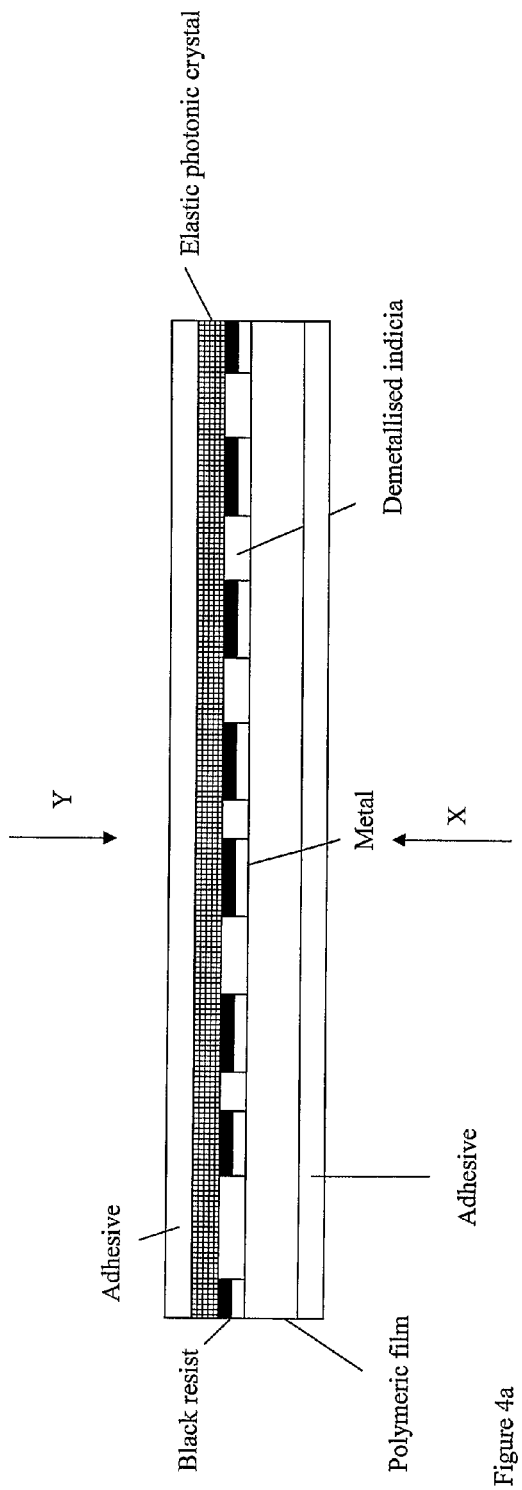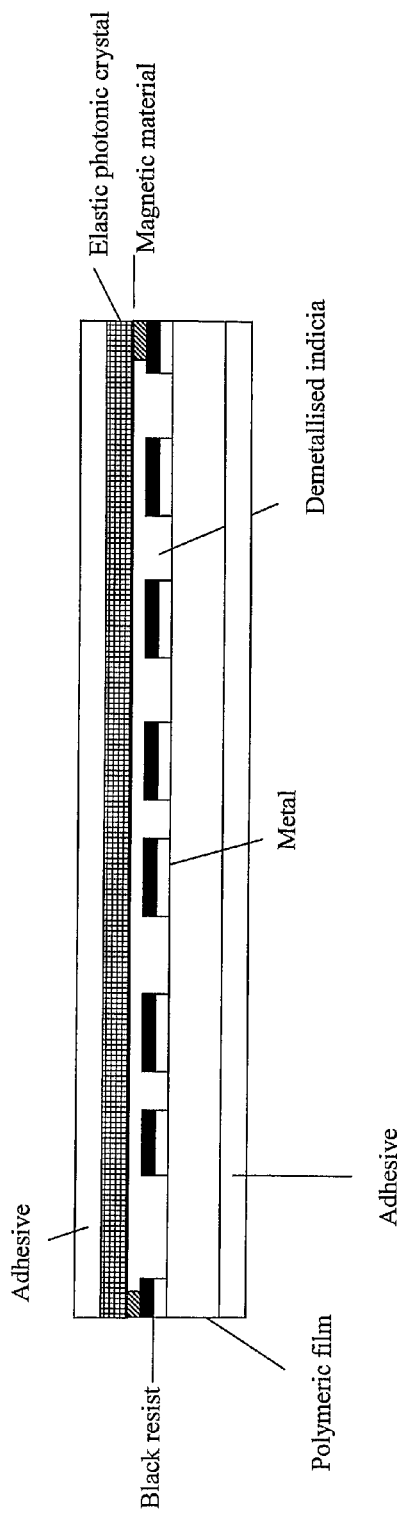
Figure 4a
Figure 4b

Photonic crystal device

Paper substrate

Aperture

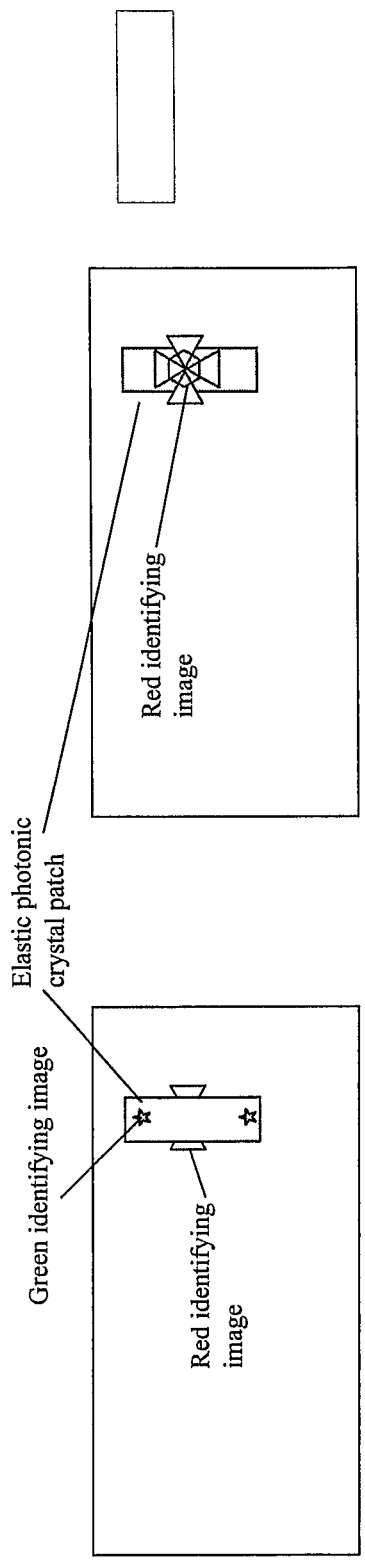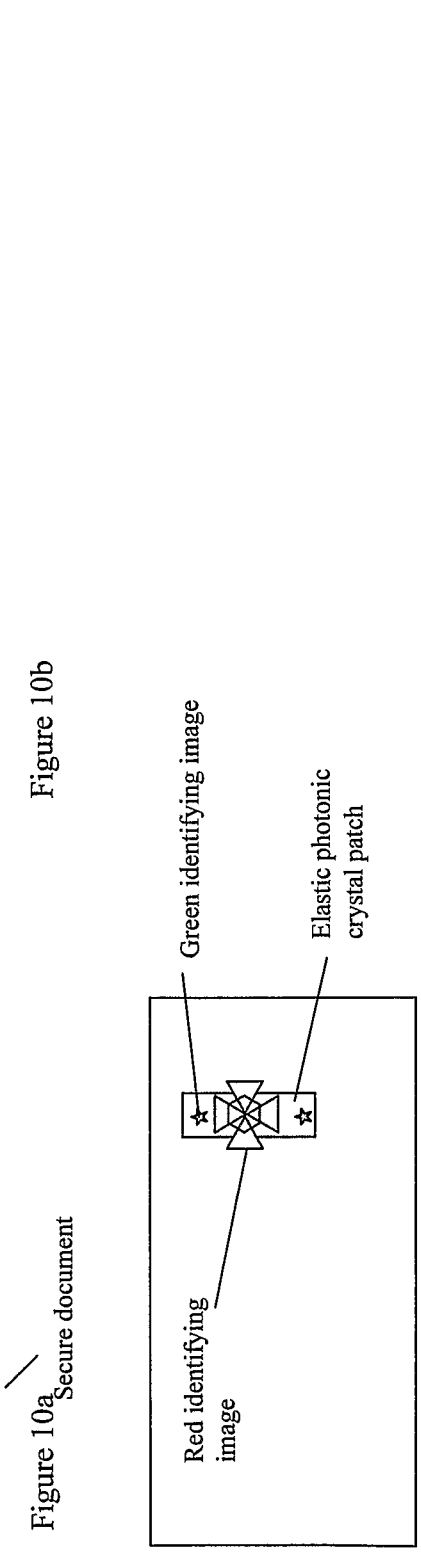

PHOTONIC CRYSTAL SECURITY DEVICE

The present invention relates to improvements in security devices that can be used in varying shapes and sizes for various authenticating or security applications.

Security documents such as banknotes now frequently carry optically variable devices that exhibit an angularly dependent coloured reflection. This has been motivated by the progress in the fields of computer-based desktop publishing and scanning, which renders conventional security print technologies such as intaglio and offset printing more prone to attempts to replicate or mimic. It is well known in the prior art to use liquid crystal materials or thin film interference structures to generate such angularly dependent coloured reflection. Examples of liquid crystal based security devices are described in EP0435029, WO03061980, and EP1156934 and examples of security devices utilising thin film interference structures are described in U.S. Pat. No. 4,186,943 and US20050029800.

The planar nature of liquid crystal films and thin film interference structures results in the observed angularly dependent coloured reflection exhibiting limited spatial variation for example a simple red to green colour change on tilting the security device away from normal incidence.

Photonic crystals are structured optical materials in which the refractive index varies periodically in two or preferably three dimensions. These materials exhibit a range of interesting optical effects when subject to electromagnetic radiation of a wavelength comparable to the spatial modulation of the refractive index. Bragg reflection may occur over a range of wavelengths that depends on the direction of incidence/propagation and the periodicity of refractive index variation. This gives rise to photonic 'energy gaps' that are analogous to the electronic band gaps in semiconductors. Typically, electromagnetic waves within a certain frequency range cannot propagate in particular directions within the crystal, and incident electromagnetic radiation at these wavelengths is consequently reflected. It is the presence of such partial photonic band gaps that gives rise to the shimmering colours observed in opal gemstones.

In general there is a complex dependence on the wavelength, direction of propagation and polarisation that dictates which electromagnetic waves may propagate within the photonic crystal and those that are otherwise reflected. However, if the modulation in refractive index is sufficiently strong, propagation of certain frequencies can be forbidden for any crystalline direction, and a complete photonic band gap arises. In this case light is prevented from propagating within the crystal in any direction, and the material acts as an ideal reflector such that all light of a wavelength within the band gap range is perfectly reflected irrespective of the incident direction.

There exists two well-documented methods of fabricating structures with the necessary highly ordered variation in refractive index—microfabrication and self-assembly. Due to the complexity of microfabrication considerable effort has been devoted to investigating self-assembling systems comprised of submicron three-dimensional arrays of dielectric spheres. Such photonic crystals are formed by allowing a colloidal suspension of identically sized spheres to settle slowly under the influence of gravity or by the application of an external force such that spheres naturally order. One well-known example is the fabrication of synthetic opal structures where uniformly sized sub-micron silica spheres are organised through a sedimentation process into a face-centred cubic crystal structure.

Further enhancements to this technique have been developed such that the synthetic opal acts as a precursor or template to further customise the structure. It has been shown that it is possible to use such systems as templates to realise materials known as inverted opals. Here, the voids between the silica spheres are first filled with materials of a high refractive index, and the silica is then dissolved by chemical means to give a material that consists of air spheres separated by a uniform matrix of the high refractive index material.

The use of photonic crystals to generate angular dependent coloured reflection is described in WO03062900 and US20050228072. The optical properties of photonic crystals can be engineered and varied to a greater extent than the optical properties of planar liquid crystal and thin film interference devices. Firstly the angular and wavelength dependence of the reflected light can be more easily controlled by varying the crystal lattice structure by either simply adjusting the sphere size, or the sphere separation. Similarly, selected allowed and disallowed reflections/transmissions may be engineered or enhanced by introducing structural defects into the lattice or by introducing nanoparticles into the structure. This in principle gives freedom to modify and engineer the band structure and hence the wavelength and spatial dependence of the reflectivity.

The use of photonic crystals in security devices has been limited and in the prior art their use is limited to a simple angular dependent coloured reflection the authenticator observes by tilting the device. There is also no teaching in the prior art on how to incorporate such devices into security documents such that the additional optical effects possible from photonic crystals, compared to other well known dichroic materials, can be used to validate the document. The object of the current invention is to improve the security of the devices described in the prior art.

In accordance with a first aspect of the invention we provide an optically variable security device comprising a photonic crystal which, upon receipt of incident light, generates a first optical effect, and which, when the device is subjected to an external stimulus, generates a second optical effect that is different from the first optical effect, wherein at least one of the first and second optical effects is an optically variable effect observable over a set of directions and caused by the light being selectively reflected or transmitted by the crystal.

We have realised that photonic crystals which have modifiable properties as a result of an external stimulus provide great advantage in the field of optically variable security devices.

One optical effect in each respective case may produce a non-optically variable effect, such as reflection of the incident light at all wavelengths. Typically however, the said optical effect generated is a second optically variable effect that is different from the first.

The second optical effect is preferably observable over the first set of directions, a subset of such directions or a larger set of directions comprising the first set.

The term "observable" is intended to include observation by the naked eye and/or using appropriate instrumentation. Thus the effects may be partly or wholly in the non-visible spectrum (such as UV or IR), although they may be observed nevertheless using appropriate detectors.

Typically the or each optically variable effect is dependent upon the crystal orientation with respect to the incident light and the or each optically variable effect may also be a function of the viewing angle with respect to the crystal.

The light may comprise a visible and/or non-visible light, therefore including for example ultraviolet and infra-red light. Broad or narrow wavelength bands may be used. When the light is produced by a white light (broad wavelength band) source, preferably the effect observed is a colour effect.

Preferably, the optically variable security device therefore comprises a photonic crystal that exhibits at least one angular dependent coloured reflection at ambient conditions and a second different angular dependent coloured reflection when a specified external stimulus is applied.

The change of the optical effect by the application of an external stimulus, preferably provided directly by the authenticator, provides an overt interactive characteristic to the device thereby increasing the memorability of the security feature to the general public. The device is therefore straightforward for the member of the public to authenticate but very difficult to counterfeit due to the requirement to replicate the change in the optical effect when the external stimulus is applied.

The external stimulus may take a number of forms either alone or in combination, these including mechanical, thermal, chemical, electrical, magnetic, electromagnetic or ultrasonic stimuli.

The difference between the optical response of the crystal in the presence and absence of the external stimulus is preferably of sufficient magnitude to be detectable visually by a human observer and/or is machine-readable. Preferably therefore the first optically variable effect is a first angularly dependent colour effect and the second optically variable effect is a second angularly dependent colour effect, that is different from the first. In this way, the colour observed is a different function of the viewing angle when viewing in the presence and absence of the external stimulus.

The abovementioned effects may be typically reflective effects, although transmissive effects are also contemplated. Reflected light in the context of the present invention includes both specularly reflected light and scattered light.

Preferably the stimulus causes a modification in the periodic spacing of one or more refractive entities within the crystal structure. In one embodiment the modification is the direct result of deformation due to an applied stress, but in alternative embodiments there is no direct mechanical deformation and the modification is induced indirectly for example in the case of a thermal, chemical, electrical, magnetic, electromagnetic or ultrasonic stimulus.

In some cases, the stimulus causes a modification in the refractive index of one or more refractive entities within the crystal structure. For example, one or more of the entities within the crystal structure may exhibit electro-optical, magneto-optical or chemical effects wherein the change in the crystal structure is primarily one relating to a refractive index rather than spacing of the various entities from which the crystal structure is comprised. In chemical terms, this might for example result from the uptake of water. However a combination of this with mechanical modification of the periodic spacing within the crystal is also envisaged.

The photonic crystal may be selected such that the effect of the stimulus upon the crystal is reversible upon removal of the stimulus or upon application of an opposite stimulus. The crystal lattice spacing can therefore be reversibly modified, for example contracted or expanded, in some cases elastically, by applying an external stimulus.

One preferred example is reversibly modifying the photonic crystal lattice spacing by mechanically stretching, bending, poking or pressing the material. As a result the characteristics of the full or partial photonic band gap that derive from the periodicity of the photonic crystal lattice are altered, and hence the reflective and transmissive properties can be engineered to respond to a mechanical stimulus. Suitable photonic crystals for use with a stimulus of mechanical deformation are those which have a flexible, elastomeric matrix and are known as elastic photonic crystals.

Elastic photonic crystals typically comprise polymeric materials for both the matrix and the spheres. Typical examples of elastic photonic crystals suitable for the current invention are described in US20040131799, US20050228072, US20040253443 and U.S. Pat. No. 6,337, 131. The crystal may be formed from spheres of the first material and a matrix of a second material wherein each material has a different respective refractive index. The matrix therefore may be readily deformable by taking the form of an elastomeric material.

Materials suitable for forming the spheres are preferably single polymer or copolymer materials. Typical examples include both polymers and copolymers of polymerisable unsaturated monomers and polycondensates and copolycondensates of monomers containing at least two reactive groups, such as, for example, high-molecular-weight aliphatic, aliphatic/aromatic or fully aromatic polyesters, polyamides, polycarbonates, polyureas and polyurethanes, but also amino and phenolic resins, such as, for example, melamine-formaldehyde, urea-formaldehyde and phenol-formaldehyde condensates, are suitable.

Materials suitable for forming an elastomeric matrix are addition polymers having a low glass transition temperature. Examples include addition polymers and copolymers of polymerizable unsaturated monomers and also of the polycondensates and copolycondensates of monomers having two or more reactive groups, e.g., high molecular weight aliphatic, aliphatic-aromatic or wholly aromatic polyesters and polyamides, but also of the amino and phenolic resins, such as melamine-formaldehyde, urea-formaldehyde and phenol-formaldehyde condensates.

Non-polymeric materials are also envisaged for the spheres and the matrix and they may be inorganic or metallic or a hybrid composite.

Various types of crystals may be used to achieve the present invention, and it should be noted that the term "photonic crystal" is intended to include quasi-crystals that exhibit this effect, as well as more conventional ordered "non-quasi" photonic crystals.

It is also envisaged that the structural parameters of the photonic crystal may be arranged to be different in different regions of the crystal, so as to effectively generate multiple crystals with different optical properties. Furthermore, the "crystal" may comprise a plurality of individual crystals.

The photonic crystal may be provided in a number of forms, for example as a self-supporting layer. Alternatively, it may be supported by a substrate or carrier layer to which it is mounted directly or indirectly (through one or more further layers). The substrate or the carrier layer may take the form of a polymeric layer.

The security device may also comprise one or more further adhesive layers, for example, for bonding the device to a further device and/or security document. Typically one or more of such adhesive layers are provided upon an outer surface of the device.

A scattering layer may also be provided so as to cause scattering of the reflected light from the photonic crystal.

The optically variable security device may further comprise an optically absorbent material provided as one or more layers applied to the device. Such a layer may be provided upon the photonic crystal or indeed the material may be formed within the crystal structure itself. A combination of these is also contemplated. The inclusion of such an absorbent material can be used to enhance the optical effect to an observer, or used to modify the optical effect by the use of for example absorbent materials that are selectively absorbent at the wavelengths of light used. In some examples dyes or inks are used for this purpose.

The optical properties may also be additionally or alternatively further modified or enhanced by the use of nanoparticles positioned within the crystal structure, preferably at interstitial sites. The nanoparticles may be distributed substantially uniformly through the crystal such that each part of the crystal exhibits substantially the same optical effect. Alternatively the nanoparticles may be distributed inhomogeneously through the crystal such that different parts of the crystal exhibit a substantially different optical effect. Thus the nanoparticles may be distributed according to a concentration gradient. The nanoparticles may also be distributed in a number of regions having different concentrations.

The optically variable security device may further comprise a metallised layer. Preferably such as layer is selectively demetallised at a number of locations. In addition the device may further comprise a layer of resist upon the metallised layer. The metallised layer and/or the layer of resist is preferably arranged as indicia. Such layers with or without indicia may be visible from the same side of the photonic crystal that receives the light, or from the reverse side. Transmissive viewing of the layers is also contemplated.

It is also preferred that the device is arranged to be machine-readable. This may be achieved in a number of ways. For example at least one layer of the device (optionally as a separate layer) or the photonic crystal itself may further comprise machine-readable material. Preferably the machine-readable material is a magnetic material, such as magnetite. The machine-readable material may be responsive to an external stimulus. Furthermore, when the machine-readable material is formed into a layer, this layer may be transparent.

The optically variable security device may be used in many different applications, for example by attachment to objects of value. Preferably, the security devices are adhered to or substantially contained within a security document. Such security documents include banknotes, cheques, passports, identity cards, certificates of authenticity, fiscal stamps and other documents for securing value or personal identity.

The security device may therefore be attached to a surface of such a document or it may be embedded within the document so as to provide crystal surfaces for receiving incident light on one or each of opposing faces of the document. The security device may take various different forms for use with security documents, these including a security thread, a security fibre, a security patch, a security strip, a security stripe or a security foil as non-limiting examples.

Preferably the photonic crystal material for use in the current invention is in the form of a film. Production methods for forming films of photonic crystal materials are known in the art. For example films can be made using standard polymer continuous processing techniques such as rolling, calendaring, film blowing or flat-film extrusion as detailed in US20050228072. In this process the alignment of the spheres occurs under the mechanical force applied by the film forming process. Once the film is formed the matrix is cross-linked to fix the orientation of the spheres. Alternatively a film of photonic crystal material can be made by applying a coating composition comprising the spheres and matrix to a carrier film as described in U.S. Pat. No. 6,337,131. Once the coating composition has been applied any dispersing or diluting material is removed and the spheres orientate via a settling process following which the matrix is cross-linked to fix the orientation of the spheres.

Alternatively the photonic crystal material can be used in a powder or pigmented form. The pigments are obtained by forming a film on a carrier layer, detaching the film and grinding it up into a pigment or powder.

The security device may include other additional security features or the device may be overlaid over an additional security feature, one example of which is the selectively demetallised layer discussed above, in order to provide enhanced security. The security device may also be supported upon a transparent layer, for example to allow the surface contacted by the transparent layer to receive or transmit light.

Security threads are now present in many of the world's currencies as well as vouchers, passports, travellers' cheques and other documents. In many cases the thread is provided in a partially embedded or windowed fashion where the thread appears to weave in and out of the paper. One method for producing paper with so-called windowed threads can be found in EP0059056. EP0860298 and WO03095188 describe different approaches for the embedding of wider partially exposed threads into a paper substrate. Wide threads, typically with a width of 2-6mm, are particularly useful as the additional exposed area allows for better use of optically variable devices such as the current invention.

The device could be incorporated into a document such that regions of the device are viewable from both sides of the document. Techniques are known in the art for forming transparent regions in both paper and polymer substrates. For example, WO8300659 describes a polymer banknote formed from a transparent substrate comprising an opacifying coating on both sides of the substrate. The opacifying coating is omitted in localised regions on both sides of the substrate to form a transparent region.

Methods for incorporating a security device such that it is viewable from both sides of a paper document are described in EP1141480 and WO03054297. In the method described in EP1141480 one side of the device is wholly exposed at one surface of the document in which it is partially embedded, and partially exposed in windows at the other surface of the substrate.

In the case of a stripe or patch the photonic crystal film is preferably prefabricated on a carrier substrate and transferred to the substrate in a subsequent working step. The photonic crystal film can be applied to the document using an adhesive layer. The adhesive layer is applied either to the photonic crystal film or the surface of the secure document to which the device is to be applied. After transfer the carrier strip can be removed leaving the photonic crystal film device as the exposed layer or alternatively the carrier layer can remain as part of the structure acting as an outer protective layer.

Following the application of the photonic crystal device the document, such as a banknote, undergoes further standard security printing processes including one or more of the following; wet or dry lithographic printing, intaglio printing, letterpress printing, flexographic printing, screen-printing, and/or gravure printing. In a preferred example and to increase the effectiveness of the security device against counterfeiting the design of the security device should be linked to the document it is protecting by content and registration to the designs and identifying information provided on the document.

Furthermore the photonic crystal device may be customised by overprinting or embossing either before or after it is incorporated into the security document. The embossing may comprise a coarse non-diffractive embossing or a diffractive embossing. The device may be arranged to produce a latent image which is selectively visible according to the viewing angle and/or the application of an external stimulus. The surface of the photonic crystal may be directly embossed to produce raised structures which can be used to form a latent image. Furthermore the device may be arranged to comprise a hologram, optionally using an embossed structure on the photonic crystal surface, or by providing a diffractive structure in a further metallic layer which may partially overlay the crystal for example.

In examples particularly directed at mechanical deformation so as to produce the optical effect, the security device may be provided as a projection so that it or a part attached to the device may be grasped by a user and deformed (plastically or elastically) so as to apply the external stimulus.

Some examples of the invention will now be described with reference to the accompanying drawings, in which:

FIG. 4a shows a security device according to a fourth example having demetallised characters;

FIG. 4b shows a machine-readable fifth example including magnetic material;

FIGS. 19a,b,c show the seventeenth example security device when viewed at three different levels of deformation (19a, 19b, 19c respectively); and, FIGS. 20a,b,c show a security device according to an eighteenth example when viewed at three different levels of deformation (20a,20b,20c respectively).

Figure 1:
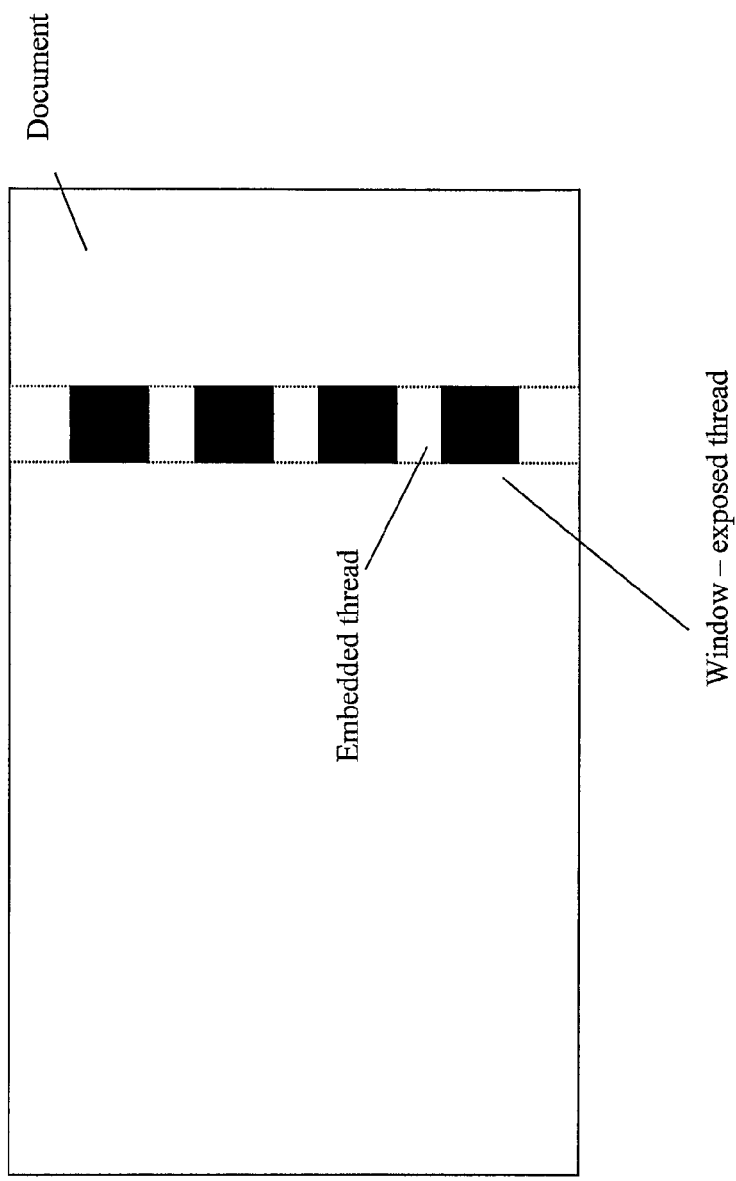
FIG. 1 shows a security device of a first example incorporated into a security document.
Figure 2:
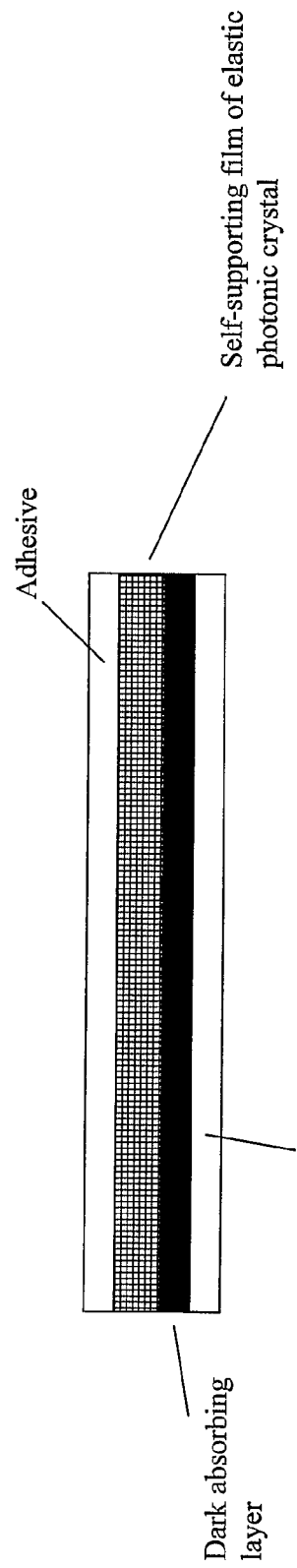
FIG. 2 shows a second example of a security device for use in a windowed security thread.

FIG. 1 shows the security device of the current invention incorporated into a security document as a windowed thread with windows of exposed thread and areas of embedded thread. FIG. 2 shows a cross-sectional view of one example of the current invention suitable for application as a windowed security thread. The device comprises a self-supporting elastic photonic crystal film, onto which is applied a dark absorbing layer. An adhesive layer may be applied to the outer surfaces of the device to improve adherence to the secure document.

When the device in FIG. 1 is viewed down on the elastic photonic crystal film in reflection under ambient conditions, i.e. prior to the application of an external stimulus, a highly contrasting colour shift effect is observed in the window regions from the photonic crystal layer as the device is tilted. For example the colourshift can be from red, when viewed at a normal angle of incidence to the plane of substrate, to green when viewed at a specified angle of incidence to the plane of the substrate. On pressing the security device in the exposed window regions, a contraction occurs in the crystal lattice spacing of the elastic photonic crystal perpendicular to the plane of the security device. This contraction modifies the photonic band structure of the crystal and hence the wavelength and spatial dependence of the reflectivity observed by the authenticator. In this example the contraction of the lattice results in the observed colour moving to a shorter wavelength for example on initial application of the pressure red goes to green and then as the pressure is increased further green goes to blue. An angular dependent colourshift will also be observed when the device is in its deformed state for example this could be from green to blue as the substrate is tilted in its initial pressed state. On removal of the deformation the photonic crystal layer will revert to its original colour and therefore the authentication process is reversible.

The materials used in the elastic photonic crystal film can be selected such that when the pressure is removed the ambient optical properties of the device do not instantly return but instead there is a delay such that the new colour can be easily verified.

Figure 3:
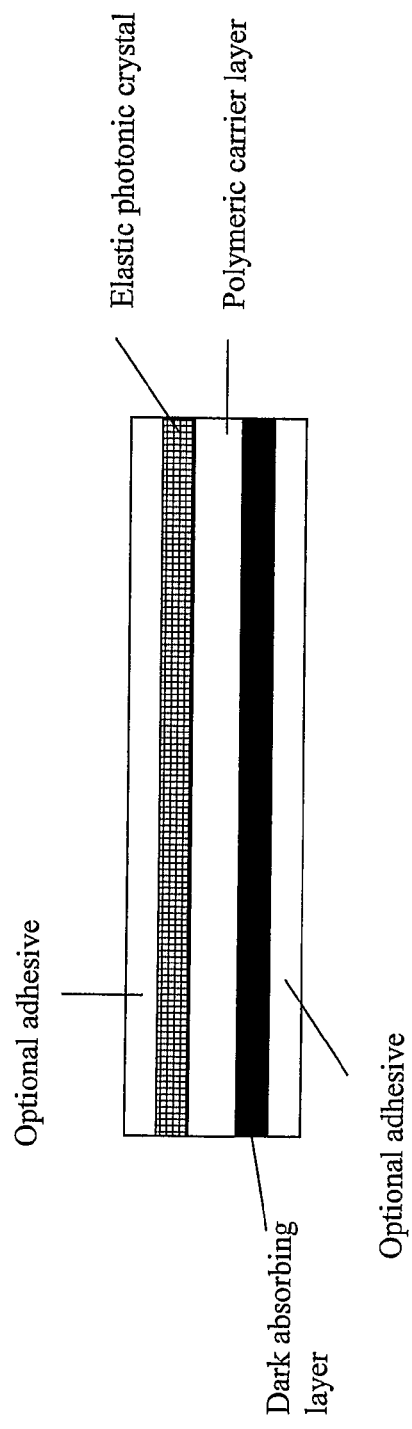
FIG. 3 shows a security device according to a third example having a polymeric carrier layer.

In an alternative structure to that shown in FIG. 2, and illustrated in FIG. 3, the security device comprises a polymeric carrier substrate, for example Polyethylene Terephthalate (PET) or Bi-axially Oriented Polypropylene (BOPP), onto which is applied a dark absorbing layer. A layer of elastic photonic crystal material is then applied to the opposite surface of the carrier film, or alternatively on to the dark absorbing layer. The elastic photonic crystal layer may be formed directly onto the carrier substrate as a coated film or formed as a separate film and then laminated to the carrier substrate. The separate film can be formed as a self-supporting layer, using for example extrusion, or by coating onto a temporary carrier layer which is then discarded during the lamination process. This is particularly beneficial when the carrier substrate for the security thread comprises additional security features, such as magnetic layers and metallised layers comprising demetallised characters, which may not be suitable to be applied directly to the photonic crystal layer or which reduce the suitability of the carrier substrate to be used as a layer onto which the elastic photonic crystal can be directly formed. An adhesive layer may be applied to the outer surfaces of the device to improve adherence to the secure document.

The fact that the security device in FIGS. 1, 2 and 3 is in the form of a windowing security thread is for illustration only and the elastic photonic crystal could just as easily be employed as part of a surface applied security feature such as a stripe or a patch.

The example of the current invention described in FIGS. 1 and 2 is viewed primarily in reflection and as such the optical effects of the photonic crystal material are best visualised against a dark non-selectively absorbing background. This can be achieved by placing an absorbing layer under the photonic crystal layer or by the introduction of absorbing particles into the photonic crystal materials. The absorbing particles should be significantly greater than the size of the spheres of the photonic lattice such that they do not cause a change in the lattice and consequently an undesirable change in the optical properties.

Whilst the use of a black, or very dark, substantially totally absorbing layer may give rise to the most strong colourshifts, other effects may be generated by the use of a partially absorbing layer of other colours or a combination of colours, giving rise to differing apparent colourshift colours. The absorbing layer of the current invention may comprise a pigmented ink or coating or alternatively a non-pigmented absorbing dye can be used.

The optical properties of the photonic crystal layer can be customised by modifying the characteristics of the photonic crystal lattice. The presence of a full or partial photonic band gap, resulting in the exclusion of certain wavelengths for specific directions of incidence/propagation, arises from the difference in refractive index between the matrix and the spheres forming the photonic crystal. Increasing the difference in refractive index between the spheres and the matrix increases the intensity of the observed colours and colourshifts and increases the number of directions of incidence propagation over which a specific wavelength is excluded.

Photonic crystals that can be more easily formed into films typically comprise polymeric materials for both the matrix and the spheres. Suitable examples can be found in U.S. Pat. No. 6,337,131 and US20050228072. In this case the polymers for both the matrix and the spheres are selected to maximise the refractive index difference. The refractive index difference should be at least 0.001, but more preferably greater than 0.01 and even more preferably greater than 0.1.

A specific example of polymeric materials that can be used to produce an elastic photonic crystal material suitable for use in the current invention consists of spheres of crosslinked polystyrene in an polyethylacrylate matrix. A polymethylmethacrylate interlayer is present between the spheres and the matrix to ensure compatibility. The elastic photonic crystal material produced exhibits a face-centred-cubic crystalline structure with the (111) plane parallel to the surface of the film.

The optical properties of the photonic crystal layer can also be modified by changing the crystal structure, the crystal spacing or the size of the spheres. For the specific example discussed above Ruhl et al, in Polymer 44 (2003) 7625-7634, have shown that the polystyrene sphere diameter can be varied between 150 and 300 nm to produce films of different colours when viewed at normal incidence without the application of an external stimulus. For example when viewing at normal incidence and without application of an external stimulus the colour varies with the sphere size as follows:

| Sphere Size (nm) | Colour observed at normal incidence |
|---|---|
| 207 | Blue |
| 249 | Green |
| 259 | Yellow |
| 282 | Red |

As a general guide, irrespective of the polymer type, the particle size of the spheres is preferably in the range 50-500 nm, and even more preferably in the range 100-500 nm, in order for the crystal to reflect light in the visible region of the electromagnetic spectrum.

It has been reported in the scientific literature (see Optics Express, Vol 15, No. 15, Page 9553-9561, 23$^{rd}$ Jul. 2007) that nanoparticles can be introduced into the matrix of a photonic crystal in order to change or enhance the observed colours, colourshifts and tolerance on illumination angle. Preferably the size of the nanoparticles are selected such that they sit within the interstitial sites of the crystal lattice. The nanoparticles enhance resonant scattering events that occur within the photonic crystal giving rise to strong structural colours. For example the incorporation of carbon nanoparticles less than 50 nm in diameter into the polystyrene/polyethlyacrylate system cited above with a sphere size of 200 nm, enhances the resonant scattering of the photonic crystal and dramatically alters the appearance of the photonic crystal film from one with a weakly coloured opalescene appearance to an intensely coloured green film. The use of the nanoparticles therefore provides a key advantage in that strongly intense colours are observed without the requirement for a separate absorbing layer or the incorporation of coarse absorbing particles. Furthermore there is an increased tolerance on illumination angle such that the observed colour is no longer as dependent on the position of the light source. In a second example magnetite nanoparticles can be incorporated to generate a magnetic machine-readable colourshifting film.

The concentration of the nanoparticles may be varied across the device. For example the nanoparticles could be introduced into localised regions or there could be a gradient in the number of nanoparticles across the device. This will result in a variation in the intensity of the colour and the associated colourshift across the device.

In one preferred embodiment the elastic photonic crystal film is produced by an extrusion process and the nanoparticles are added to the polymer reservoir prior to extrusion. In this case laterally spaced bands of nanoparticles can be achieved by providing a set of dividers in the polymer reservoir so that the additives are supplied through the extruder at corresponding lateral positions.

The particles may be made from material which is orientable in an electric, magnetic or electromagnetic field. In this way, alignment of the particles may be affected by selective application of that specified field to the elastic photonic crystal film prior to the final cross-linking step in the film production.

Nano-photoluminescent particles such as quantum dots may be added to create a novel photoluminescence security feature. For example PbS nanoparticles can be added to produce luminescent films. It has been shown in the scientific literature (Nature Materials Volume 5 Mar. 2006 Page 179) that embedding quantum dots in a photonic crystal results in suppression of luminescence if the emission frequency falls within the band gap of the photonic crystal. If the position of the photonic band gap can be changed in response to external stimulus, such that it overlaps or crosses through the photoluminescence peak of the embedded emitter suppression/enhancement of emission and dynamic modification of the luminescence lifetimes may occur. If the external stimulus is a mechanical deformation an interactive security device is created where the fluorescence or phosphorescence is switched on or off by simply pressing the device.

Security devices comprising photonic crystal materials are inherently machine-readable due to the wavelength selectivity of the photonic crystal materials. In further examples the machine readable-aspect of the current invention can be extended further by the introduction of detectable materials in the photonic crystal or by the introduction of separate machine-readable layers. Detectable materials that react to an external stimulus include but are not limited to fluorescent, phosphorescent, infrared absorbing, thermochromic, photochromic, magnetic, electrochromic, conductive and piezochromic materials.

In one preferred embodiment, the pigment in the separate absorbing layers is machine readable, for example carbon black, to produce a machine-readable, conducting, or IR absorbing layer. Alternatively it may be a magnetic material, such as magnetite, to produce a machine-readable magnetic layer.

It will be further understood by those skilled in the art that the security device of the current invention could be used in combination with existing approaches for the manufacture of security threads. Examples of suitable methods and constructions that can be used include, but are not limited to, those cited within WO03061980, EP0516790, WO9825236, and WO9928852.

FIG. 4a illustrates how the current invention can be combined with demetallised characters for application as a windowed security thread. The method requires a metallised film comprising a substantially clear polymeric film of PET or the like, which has an opaque layer of metal on a first side thereof. A suitable pre-metallised film is metallised MELINEX S film from DuPont of preferably 19 μm thickness. The metal layer is printed with a resist which contains a black or dark dye or pigment. Suitable resists include the dye BASF Neozapon X51 or the pigment (well dispersed) "Carbon Black 7" mixed into a material with both good adhesion to metal and caustic resistance. The printed metallised film is then partially demetallised, according to a known demetallisation process using a caustic wash which removes the metal in the regions not printed with the resist. The remaining regions coated with resist provide a black layer which is visible when the demetallised film is viewed from its first side (along arrow Y) interspersed with clear regions. The shiny metal of the remaining parts of the metallic layer are only visible from an opposite side of the demetallised film (along arrow X). The resist may be printed in the form of the indicia such as words, numerals, patterns and the like; in which case the resulting indicia will be positively metallised, with the metal still covered by the dark or black resist. Alternatively the resist may be printed so as to form indicia negatively, in which case the resulting indicia will be provided by the demetallised regions. The indicia however formed, are clearly visible from both sides, especially in transmitted light, due to the contrast between the regions of the metal which have been removed and the remaining opaque regions. The photonic crystal layer is then applied, preferably using a transfer process, as with reference to FIG. 3.

The security device illustrated in FIG. 4a exhibits two visually contrasting security characteristics. The device comprises the interactive optical effects of the elastic photonic crystal layer, as described for the previous examples, when the finished substrate is viewed in reflection from the first side (along arrow Y); and a metallic shiny partial coating when viewed from the other side (along arrow X). Additionally clear positive or negative indicia, defined by the black resist, can be seen in transmission from either side. This example is particularly advantageous when used in a device that is viewable from both sides of the document in which it is incorporated. For example the device could be incorporated into a secure document using the methods described in EP1141480 or WO03054297.

FIG. 4b illustrates a machine-readable version of the device illustrated in FIG. 4a. The device comprises a metallised PET base layer demetallised with a suitable design including tramlines of metal along each edge of the device. As described with reference to FIG. 4a a black resist is used during the demetallisation process. A protective layer may be applied onto the metal tramlines (not shown in the figure) to prevent the metal from being corroded by the magnetic layer, which is applied next. A suitable protective layer is VHL31534 supplied by Sun Chemical applied with coat weight of 2 gsm. The protective layer may optionally be pigmented. The magnetic material is only applied over the metal tramlines so as not to obscure the demetallised indicia. The photonic crystal layer is then applied, preferably using a transfer process, as with reference to FIG. 3. An adhesive layer may be applied to the outer surfaces of the device to improve adherence to the security document.

When a magnetic material is incorporated into the device either within the absorbing layer or as a separate layer the magnetic material can be applied in any design but common examples include the use of magnetic tramlines or the use of magnetic blocks to form a coded structure. Suitable magnetic materials include iron oxide pigments ($Fe_2O_3$ or $Fe_3O_4$), barium or strontium ferrites, iron, nickel, cobalt and alloys of these. In this context the term "alloy" includes materials such as Nickel:Cobalt, Iron:Aluminium:Nickel:Cobalt and the like. Flake Nickel materials can be used; in addition Iron flake materials are suitable. Typical nickel flakes have lateral dimensions in the range 5-50 microns and a thickness less than 2 microns. Typical iron flakes have lateral dimensions in the range 10-30 microns and a thickness less than 2 microns.

In an alternative machine-readable embodiment a transparent magnetic layer can be incorporated at any position within the device structure. Suitable transparent magnetic layers containing a distribution of particles of a magnetic material of a size and distributed in a concentration at which the magnetic layer remains transparent are described in WO03091953 and WO03091952.

In a further example the security device of the current invention may be incorporated in a security document such that the device is incorporated in a transparent region of the document. The security document may have a substrate formed from any conventional material including paper and polymer. Techniques are known in the art for forming transparent regions in each of these types of substrate. For example, WO8300659 describes a polymer banknote formed from a transparent substrate comprising an opacifying coating on both sides of the substrate. The opacifying coating is omitted in localised regions on both sides of the substrate to form a transparent region.

EP1141480 describes a method of making a transparent region in a paper substrate. Other methods for forming transparent regions in paper substrates are described in EP0723501, EP0724519 and WO03054297.

Figure 5:
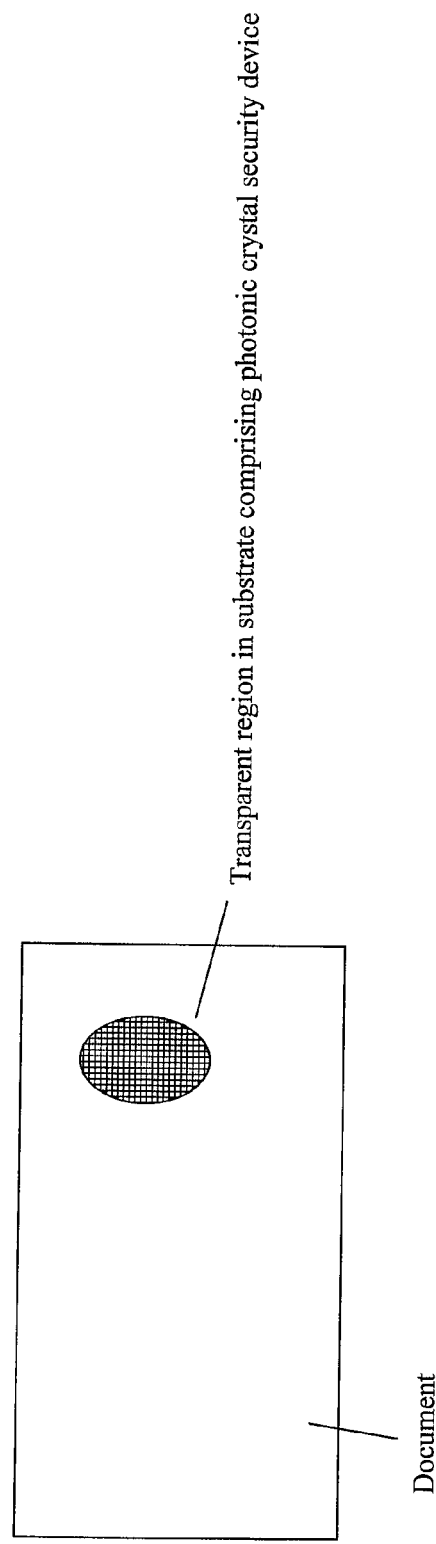
FIG. 5 shows the incorporation of a security device according to the examples within a transparent region.
Figure 6A:
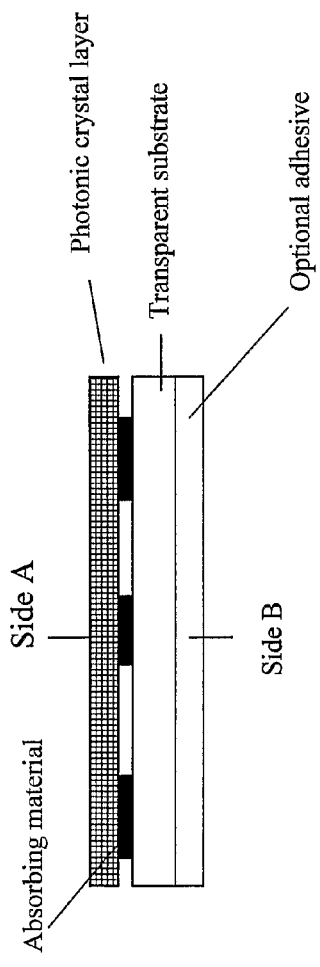
FIG. 6a shows a security device in accordance with an sixth example.

FIG. 5 shows the security device of the current invention incorporated into a transparent region of a security document. FIG. 6a shows a cross-sectional view of the security device within the transparent region. The security device comprises a transparent carrier layer, which preferably forms the transparent region of the substrate. An absorbing material is applied to the transparent layer in localised regions to form a recognisable pattern or identifying image. A layer comprising an elastic photonic crystal material, exhibiting the same optical characteristics as the elastic photonic crystal material in FIGS. 1 and 2, is located above the absorbing layer.

When the device in FIG. 6a is viewed in reflection from side A, prior to the application of an external stimulus, a highly contrasting colour shift effect is observed, from the regions of the elastic photonic crystal layer located above the absorbing layer, as the device is tilted. For example the colourshift can be from red, when viewed at a normal angle of incidence to the plane of substrate, to green when viewed at a specified angle of incidence to the plane of the substrate. When viewed in transmitted light from side A the regions above the absorbing layer still exhibit the red-green colourshift but in the regions not above the absorbing layer the transmitted colour saturates the reflective colour. The transmitted and reflected colours are complementary, for example, a red to green colourshift in reflection is seen as a cyan to magenta colourshift in transmission. On pressing the security device, a contraction occurs in the crystal lattice spacing perpendicular to the plane of the security device. This contraction modifies the photonic band structure of the crystal and hence the wavelength and spatial dependence of the reflectivity observed by the authenticator. In this example the contraction of the lattice results in the observed reflected colour moving to a shorter wavelength for example red goes to green and green goes to blue, resulting in a colour shift from green to blue as the substrate is tilted in its pressed state. In contrast the observed complementary transmitted colour moves to a longer wavelength resulting in a magenta to yellow colourshift as the substrate is tilted in its pressed state.

Figure 6B:
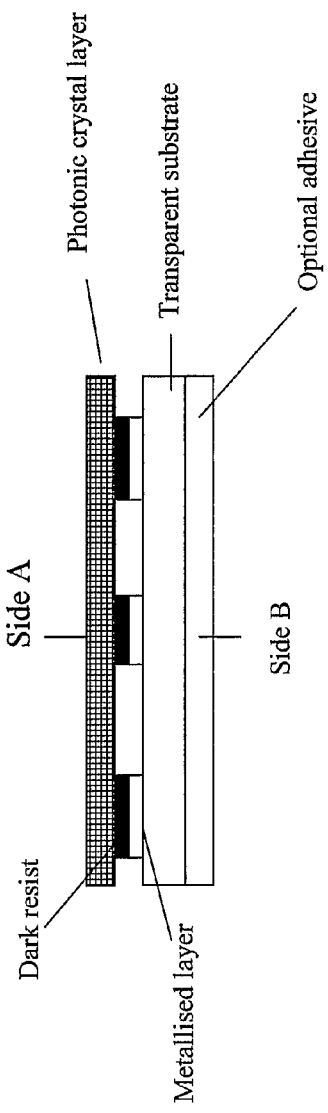
FIG. 6b shows a machine-readable seventh example as an alternative of the sixth example.

When the device in FIG. 6a is viewed in reflection or transmission from side B the dark absorbing layer will be visible in the form of an identifying image. If a dark image is not aesthetically acceptable then a more aesthetically pleasing material/colour could be used to conceal the dark resist such that it is not viewable from side B. For example the dark absorbing areas could be overprinted on side B of the transparent region with differently coloured opaque inks or metallic inks. Alternatively the transparent carrier substrate could be replaced with a metallised polymeric substrate, as illustrated in FIG. 6b. The metallised substrate is printed with a dark resist, as discussed in reference to FIG. 4, in the form of the identifying image. The printed metallised film is then partially demetallised removing the metal in the regions not printed with the resist. When viewing from side A the elastic photonic crystal film is viewed against the absorbing dark resist and appears as described with reference to FIG. 6a, but when viewing from side B a metallic image is observed of the identifying image printed with the dark resist. The image could be positive, i.e. defined by the metallic regions, or negative, i.e. defined by the transparent regions between the metallic regions.

In an alternative machine-readable construction the dark resist in FIG. 6b can be formed using a magnetic pigment, for example magnetite to provide a machine-readable code. In a further embodiment, only part of the dark resist is provided with a magnetic pigment and the remainder is provided with a non-magnetic pigment. If both the magnetic and non-magnetic regions are substantially totally absorbing there will be no visual difference in the elastic photonic crystal film over the two regions and therefore the format of the code will not be readily apparent.

The materials used in the elastic photonic crystal can be selected such that when the pressure is removed the ambient optical properties of the device do not instantly return but instead there is a delay such that the new colour can be easily verified. The presence of such a device in a transparent regions means that the device can be poked from one side and viewed from the other side. For example with reference to FIG. 6 the device can be authenticated by poking side B and viewing the reflective colourshift against the dark absorbing background from side A. In this context poking is differentiated from pressing due to the fact that the transparent regions is not back supported during the deformation.

Figure 7:
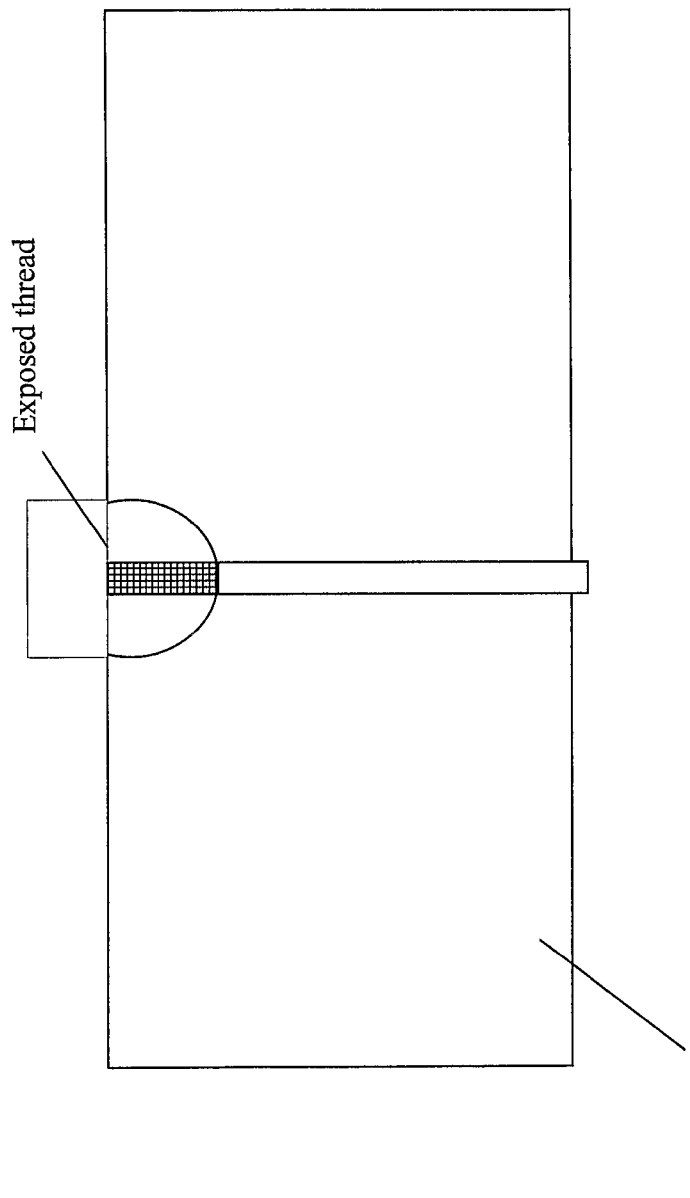
FIG. 7 shows an eighth example with a projecting security device.

In an alternative method of authentication the security device comprising an elastic photonic crystal could be stretched to carry out the authentication process. WO2004001130 describes a method for incorporating an elongate element such as a security thread into a secure document such that the elongate element is exposed within an aperture. In one example of WO2004001130 the aperture is used to form a notch on the edge of the document in which the end of a security thread is exposed as illustrated in FIG. 7. In one example of the current invention the exposed thread comprises an elastic photonic crystal layer which exhibits one angular dependent colourshift at ambient conditions and a second angular dependent colourshift when stretched. The fact that the thread is exposed enables it to be stretched easily without having to flex the document.

Figure 8C:
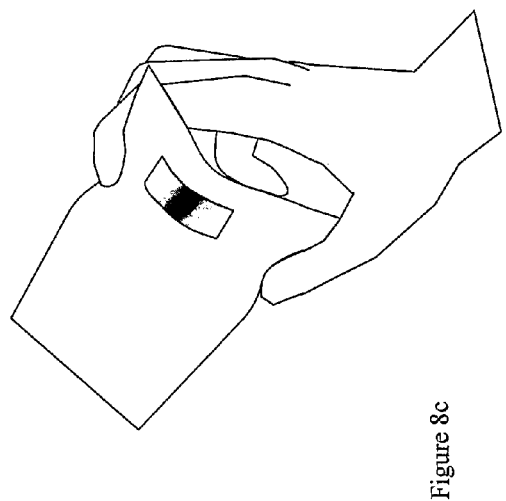
FIG. 8c is a schematic view of the ninth example being deformed in the hand of a user.
Figure 8A:
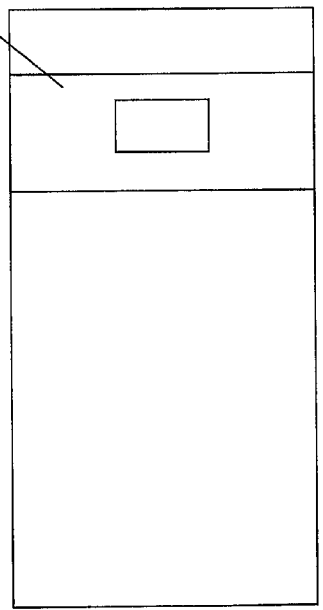
FIGS. 8a,8b show front and rear views respectively of an ninth example security device having an elastic photonic crystal.
Figure 8B:
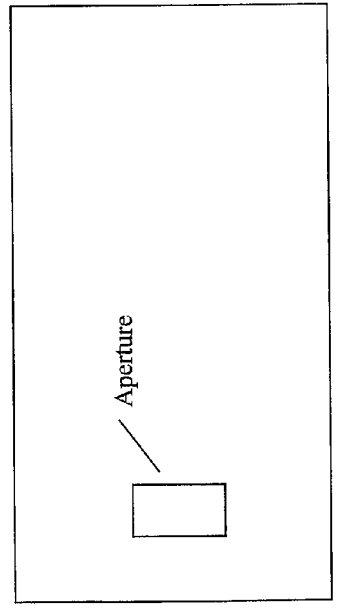

FIG. 8 illustrates an example where the security device of the current invention is incorporated into an aperture of a paper substrate. A self-supporting elastic photonic crystal film is incorporated into a paper substrate as described in EP1141480. One side of the photonic crystal film is wholly exposed on the front surface of a paper substrate in which it is partially embedded (FIG. 8a), and partially exposed in one aperture on the rear surface of the substrate (FIG. 8b). In this example the photonic crystal material comprises spheres of crosslinked polystyrene in a polyethylacrylate matrix. Carbon nanoparticles have been incorporated into the photonic crystal structure such that the film has an intense red colour when viewed at normal incidence without the application of an external stimulus.

On viewing the device from the front of the document in reflection, illustrated in FIG. 8a, prior to the application of an external stimulus a highly contrasting colour shift effect is observed along the whole of the exposed elongate security device. In this example the colourshift is from red, when viewed at a normal angle of incidence to the plane of substrate, to green when viewed at a specified angle of incidence to the plane of the substrate. The incorporation of the nanoparticles produces a single layer, i.e. non-laminate, strongly coloured substantially opaque film. This is an advantage over liquid crystal colourshifting films where the use of a separate black or dark absorbing layer is required to generate a strongly coloured substantially opaque film. If a liquid crystal based device is used in the example shown in FIG. 8 then in order for the reflective colourshifting effect to be visible from both sides of the document two liquid crystal films would be required with an absorbing layer between them. In contrast for the current invention the use of the self-supporting elastic photonic crystal film doped with carbon nanoparticles enables the reflective colourshifting effect to be visible from both sides of the document while using just a single layer of colourshifting material. On viewing the device from the rear of the document in reflection, illustrated in FIG. 8b, prior to the application of an external stimulus the same highly contrasting colour shift effect, as is observed from the front of the document, is present where the elastic photonic crystal film is exposed in the aperture.

In this example a mechanical external stimulus is applied by bending the document around its central longitudinal axis, as illustrated in FIG. 8c. This deformation modifies the photonic band structure of the crystal and hence the wavelength and spatial dependence of the reflectivity observed by the authenticator. In this example the deformation causes a contraction of the lattice perpendicular to the plane of the substrate that results in the observed colour moving to a shorter wavelength for example red goes to green and green goes to blue. In the current example the aperture is positioned such that it falls within the central axis of the document such that when the authenticator bends the document around the central axis the maximum deformation and hence colour change occurs in the aperture region of the document. An advantage of the current invention is that on deforming the elastic photonic crystal a dynamic colour change is observed. In the example in FIG. 8 as the device is bent around the central aperture the initial colour change from red to green is in the central region of the aperture where the deformation is the highest, as the document is bent further the deformation increases outwards towards the edges of the aperture and a green band is observed to move towards the edge of the aperture. If the document is bent to a sufficiently high radius of curvature the central region of the aperture will switch from green to blue. An angular dependent colourshift will also be observed when the device is in its deformed state for example this could be from green to blue as the substrate is tilted in its initial deformed state. On removal of the deformation the photonic crystal layer will revert to its original colour and therefore the authentication process is reversible. The change in colour with deformation provides an interactive component to the security device which is both memorable to the public and difficult to counterfeit.

In an alternative embodiment to that referenced in FIG. 8 the elastic photonic crystal film can be supported by a carrier layer to facilitate its incorporation into the paper document. The elastic photonic crystal layer may be formed directly onto the carrier substrate as a coated film or formed as a separate film and then laminated to the carrier substrate. The carrier substrate may comprise additional security features including de-metallised designs, holographic designs in combination with a highly reflective layer such as a metallic layer or a thin transparent layer of a high refractive index material (for example ZnS), printed indicia, luminescent or magnetic materials, and coarse embossing with a security design that may be either blind embossed to produce a tactile/visible feature or could include printing inks to further enhance visibility. In this manner a different security feature can be observed on either side of the security device.

In a further embodiment the security device of current invention can be constructed such that different colourshifting effects are observed on either surface of the security device. This can be achieved by laminating together two photonic crystal films with different optical characteristics or by varying the optical characteristics of the photonic crystal film over the thickness of the film.

Figure 9:
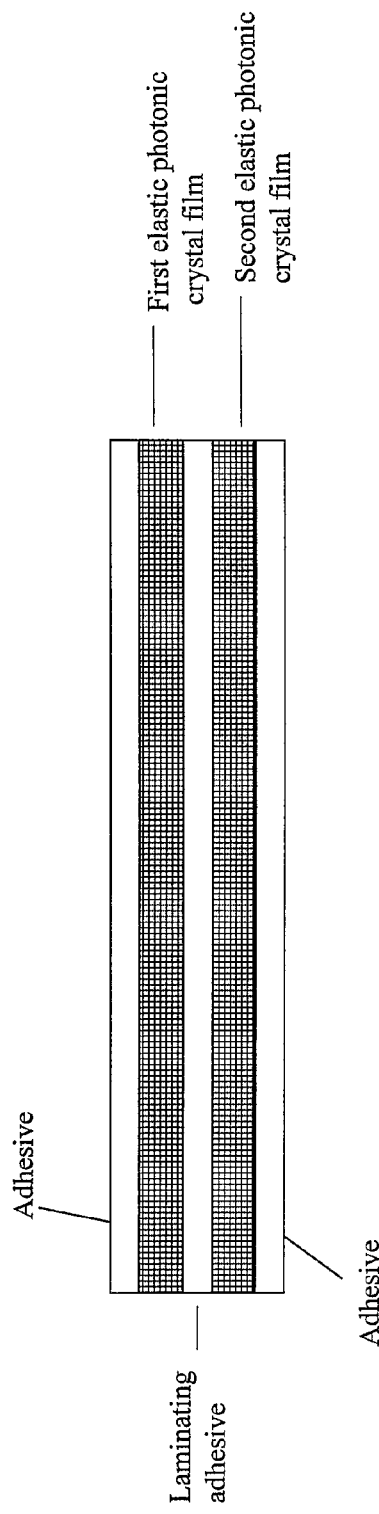
FIG. 9 shows a cross-section of a tenth example security device comprising two photonic crystals FIGS. 10a,b,c show an eleventh example security device when viewed at three different deformation levels (10a, 10b, 10c respectively)

For example two elastic photonic crystal films can be made from the same materials for the spheres and matrix but differ in their optical properties due to a difference in sphere size. FIG. 9 shows a cross-section of a security device comprising two elastic photonic crystal films adhered together with a laminating adhesive. The laminating adhesive comprises a dark dye or pigment such that it also acts as an absorbing layer. The device can be made machine-readable by incorporating a magnetic pigment into the laminating adhesive or applying an additional magnetic layer to the inner surface of one or both of the elastic photonic crystal films. An adhesive layer may be applied to the outer surfaces of the device to improve adherence to the secure document. The security device is incorporated into a document such that in at least localised regions it is exposed on both surfaces of the secure document. In this example both the first and second elastic photonic crystal films consist of spheres of crosslinked polystyrene in a polyethylacrylate matrix. A pblymethylmethacrylate interlayer is present between the spheres and the matrix to ensure compatibility. The elastic photonic crystal material produced exhibits a face-centred-cubic crystalline structure with the (111) plane parallel to the surface of the film. The first elastic photonic crystal film has a sphere size of 282 nm and appears red when viewed in reflected light at normal incidence and appears green when viewed at an oblique angle of incidence to the plane of the substrate. On deforming the security device, and viewing at normal incidence, the colour of the device changes from red to green and shifts to blue as the device is tilted in its deformed state. The second elastic photonic crystal film has a sphere size of 259 nm and appears yellow when viewed in reflected light at normal incidence and appears blue when viewed at an oblique angle of incidence to the plane of the substrate. On deforming the security device, and viewing at normal incidence, the colour of the device changes from yellow to blue and shifts to violet as the device is tilted in its deformed state.

The security device in FIG. 9 is incorporated into a document such that it coincides with an aperture in the document. The authenticator will not only observe different angular dependent colourshifts when viewing from the opposite sides of the aperture but also a different optical response when it is deformed for example by bending, poking or pressing.

Different colourshifting effects on either surface of the security device can also be generated using a single layer of elastic photonic crystal film by locally varying the optical characteristics of the elastic photonic crystal film over the thickness of the film. For example the sphere size can be varied through the thickness of the film. This variation can be introduced by controlling the assembly of the spheres during the formation of the elastic photonic crystal film. Alternatively if the film is manufactured by polymer extrusion then two polymer mixes, comprising the spheres and the matrix, can be generated with different sphere sizes. The two polymer mixes can then be co-extruded into a single polymer film forming a crystal structure where there is a step change in sphere size at an interface in the centre of the film.

The security device of the current invention may be further customised in order to increase the difficulty in counterfeiting and/or provide identifying information. The customisation process can take place before or after the device is incorporated into the document. In one example the customisation of the security device occurs by applying printed information to the elastic photonic crystal film. The elastic photonic crystal film may be printed with images using any of the conventional printing processes such as intaglio, gravure, ink jet, offset lithography, screen, dye diffusion and flexography. The print may be applied as a single print working in a single colour or as multiple print workings in multiple colours.

In a preferred embodiment the images are printed partly on the elastic photonic crystal film and partly on the substrate the device is incorporated into such that the design continues uninterrupted between the two surfaces. In a further embodiment, one of the colours of the printed images matches one of the switching colours of the elastic photonic crystal film. For example if the elastic photonic crystal film switches from red to green on pressing the device then any red printed information will be substantially invisible at normal incidence but becomes visible as the sample is pressed as the static red of the printed information contrasts with the green of the optically variable photonic crystal film. In this manner a latent image security feature can be created.

FIG. 10 illustrates another example of the present invention where a security device has been incorporated into the document as a surface applied patch. A red identifying image is printed such that a part is on the substrate and another part is on the security device. On viewing the substrate at normal incidence (FIG. 10a) the security device appears red and saturates the printed information on the security device such that only the printed information on the substrate is visible. The printed information is revealed by either pressing the security device or tilting the substrate. On tilting the substrate, the elastic photonic crystal switches from red to green and on pressing the device the elastic photonic crystal also switches from red to green and as the pressure is increased further from green to blue. In both cases the red printed information will be revealed on the security device and a complete image will be formed with the printed information on the substrate (FIG. 10b). A second green identifying image may also be printed on the security device, the green image will be visible at normal incidence but will disappear on tilting the sample as it becomes saturated by the green colour of the elastic photonic crystal. On pressing the device the green image will disappear initially as the device switches from red to green (FIG. 10b) but as the pressure is increased the green image will reappear as the device switches from green to blue (FIG. 10c).

The security device in the sample in FIG. 10 has a number of secure aspects; firstly a colourshift on tilting, secondly a colourshift on the application of an external stimulus, and thirdly the presence of two latent images which are switched on and off alternately by tilting but can be both switched on simultaneously by pressing the device.

As an alternative to the printing of ordinary coloured inks, it is also possible to print functional inks. By functional inks we mean inks that react to an external stimulus. Inks of this type include but are not limited to fluorescent, phosphorescent, infrared absorbing, thermochromic, photochromic, magnetic, electrochromic, conductive and piezochromic.

As well as functional inks, it is also possible to print onto the elastic photonic crystal film with other optical effect inks. Optical effect inks include OVI® and Oasis® marketed by Sicpa. Other optical inks include inks containing iridescent, iriodine, pearlescent, liquid crystal and metal-based pigments.

In a further embodiment, the customisation of the security device occurs by embossing the elastic photonic crystal film with raised line structures. The embossing of raised line structures into elastic photonic crystal films is particularly advantageous because the facets generated by the embossing result in a change in the angle of incidence of the incoming light, generating facets of differing colours due to the fact that the colour of the elastic photonic crystal film is dependent on the angle of view. The use of a raised line structure with an elastic photonic crystal film has two secure aspects; firstly the optically variable feature generated by the line structure and secondly the creation of localised regions exhibiting different colourshifts from the background film.

For example if the elastic photonic crystal device exhibits a green to blue colourshift on tilting the device away from normal incidence then when viewed at normal incidence the embossed and non-embossed regions will appear green. On tilting the device the non-embossed and embossed regions will change from green to blue at different angles of view as the device is tilted. Furthermore if the device comprises regions of different orientations of the embossed line structures then each region will change from green to blue at different angles of view as the device is tilted. Likewise by rotating the device in the plane of the photonic crystal film the embossed regions will switch from green to blue or vice-versa at different points in the rotation as the orientation of the embossed structures varies relative to the observer.

A further advantage of using embossed raised line structures is that the structures have a raised surface that can be identified by touch. The smooth surface of the photonic crystal film further enhances the tactility of these raised structures.

The embossed line structures can take any convenient form including straight (rectilinear) or curved such as full or partial arcs of a circle or sections of a sinusoidal wave. The lines may be continuous or discontinuous and, for example, formed of dashes, dots or other shapes. By other shapes we mean the dots or dashes could have a graphical form. The line widths are typically in the range 10-500 microns, preferably 50-300 microns. Preferably, the individual lines are barely visible to the naked eye, the main visual impression being given by an array of multiple lines. The lines can define any shape or form, for example square, triangle, hexagon, star, flower or indicia such as a letter or number.

The embossed line structures are preferably formed by applying an embossing plate to the elastic photonic crystal film under heat and pressure. Preferably the embossing process takes place during the intaglio printing process and is carried out using an intaglio plate having recesses defining the line structures. Preferably the elastic photonic crystal film is blind embossed, i.e. the recesses are not filled with ink. However it is also possible that some of the recesses defining the embossed structure may be filled with ink and others left unfilled. Further intaglio printing or blind embossing may be carried out on regions of the substrate adjacent to the security device using the same intaglio plate so as to achieve precise registration between the different regions.

Figure 11:
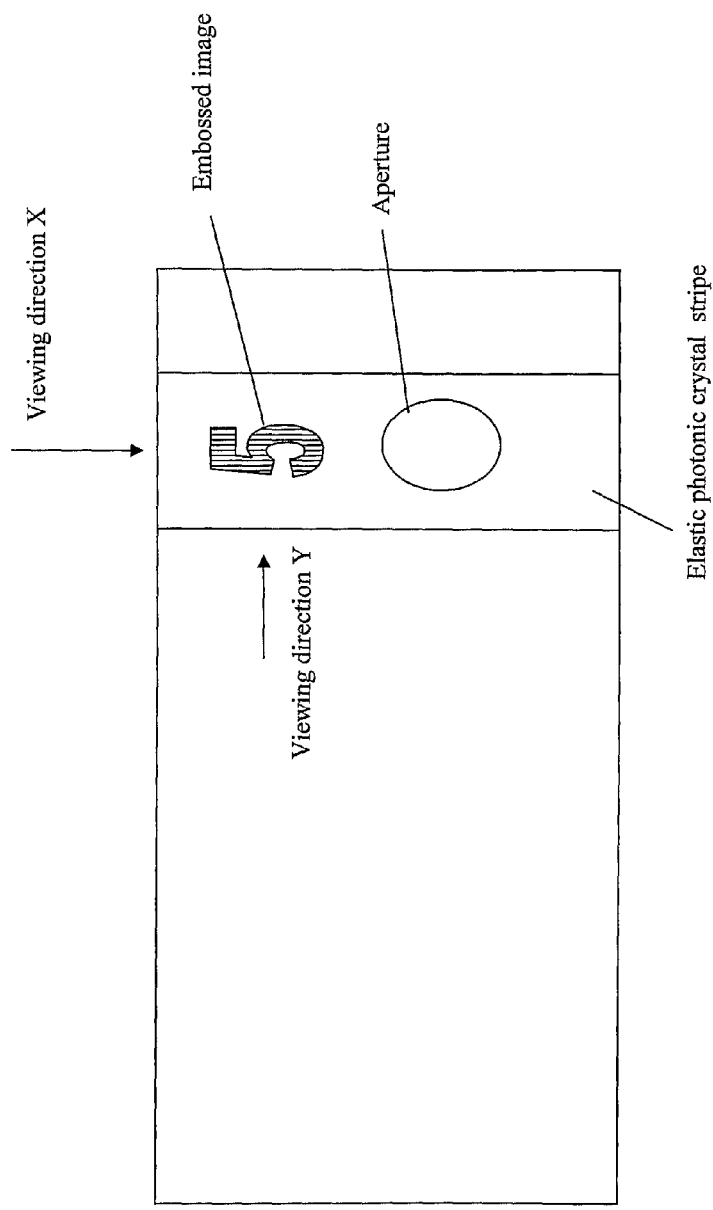
FIG. 11 shows a twelfth example security device which is further embossed.

FIG. 11 shows an example of a security substrate comprising a security device of the current invention where the elastic photonic crystal films has been customised by embossing the film after it has been applied to the base substrate. In this example the elastic photonic crystal film has been incorporated into a paper substrate in the same manner as referenced in FIG. 8 and described in EP1141480. FIG. 11 shows the front surface of the paper substrate on which the device is wholly exposed. The device is also exposed on the back surface in the aperture region. In this example the elastic photonic crystal film exhibits a red-green colourshift on tilting away from normal incidence and a red to green to blue colourshift on poking the device. The embossed line structures, formed by a respective set of substantially parallel raised lines, define the numeral "5". The embossed regions provide an additional optically variable aspect to the device in addition to the angular dependent and pressure dependent colourshifts exhibited by the non-embossed structures. When viewed at normal incidence, both the embossed and non-embossed regions appear red.

On tilting the substrate away from normal incidence, and viewing along viewing direction Y such that the lines extend at 90° to the incident light direction, the numeral "5" switches almost instantaneously from red to a predominantly green colour due to the dominant reflected light arising from the edges of the raised lines. In contrast, the non-embossed region switches from red to green at a greater angle of incidence relative to the flat substrate. The difference in the viewing angle at which the colour switch occurs arises because when viewed normally to the substrate the effective angle of incidence for light incident on the edge regions is greater than the angle of incidence for light incident on flat non-embossed regions. If the device is rotated by 90°, such that it is viewed along viewing direction X parallel to the direction of the embossed lines, then on tilting the substrate both the embossed and no-embossed regions switch from red to green at substantially the same viewing angle because very little light is reflected by the edge of the lines.

If the embossed lines are such that a significant portion of the edge region extends at an angle of approximately 45° to the base substrate, then on tilting the substrate away from normal incidence, and viewing perpendicularly to the direction of the lines, an almost instantaneous switch from red to a predominantly green colour will occur as described previously. However on tilting the substrate further, the angle of incidence for the light incident on the edge regions will move closer to normal incidence resulting in a switch back to red, effectively exhibiting a reverse colourshift.

In a further embodiment the customisation of the security device occurs by embossing the elastic photonic crystal film with a non-diffractive line structure. A non-diffractive line structure is an example of a raised line structure which produces an optically variable effect when the angle of incidence light varies, but in which this effect is not caused by interference or diffraction. Security devices based on non-diffractive line structures are known in the prior art for example WO9002658 describes a security device in which one or more transitory images are embossed into a reflective surface. WO9820382 discloses a further security device in which a group of elemental areas in which lines extend at different angles from each other form respective image pixels. U.S. Pat. No. 1,996,539 discloses a decorative device in which a relief structure is formed in a surface and has an optically variable effect. WO2005080089 discloses a security device which has segments defined by line structures in a reflective portion of a substrate, which cause incident light to be reflected non-diffractively as the angle of incidence changes.

In an alternative embodiment the security device further comprises an optically variable device such as a hologram or diffraction grating. These devices are commonly formed as relief structures in a substrate, which is then provided with a reflective coating to enhance the replay of the device. In the current invention the elastic photonic crystal can act as the reflective coating and the relief structure can be embossed directly into the elastic photonic crystal film or into an embossing lacquer applied onto the elastic photonic crystal film. Alternatively localised regions of the device can be provided with a metallised layer and the relief structure subsequently embossed into an embossing lacquer on top of the metallised layer. In this manner the device comprises two laterally spaced regions one exhibiting the colourshifting properties of the elastic photonic crystal film and one exhibiting the optically variable properties of a holographic device. Alternatively the metallic reflective coating can be replaced with a transparent reflection enhancing materials for example a thin layer of a high refractive index material such as ZnS. In this case both the colourshifting properties of the elastic photonic crystal material and the optically variable properties of the holographic device are visible in all areas of the device although the optically variable properties of the holographic device will only be visible at certain angles of view.

In a further embodiment of the invention the security device can be customised by the application of a scattering layer to the elastic photonic crystal film. In a preferred embodiment the scattering layer takes the form of a matt varnish or lacquer. In this context a matt varnish or lacquer is one that reduces the gloss of the elastic photonic crystal film by scattering the light reflected from it. One example of a suitable matt varnish is a suspension of fine particles in an organic resin. The surface particles scatter the light as it passes through the varnish resulting in a matt appearance. A suitable varnish for the present invention is "Hi-Seal O 340" supplied by Hi-Tech Coatings Ltd. In an alternative solution the fine particles can be replaced by organic waxes. As a further alternative, the scattering layer can be generated by embossing a matt structure into the surface of a photonic crystal layer. Suitable embossed matt structures are described in WO9719821. The scattering layer modifies the colourshifting properties of the elastic photonic crystal layer.

The scattering layer modifies the surface of the elastic photonic crystal film such that the reflection is now more diffuse reducing the glare of the elastic photonic crystal film and changing the angular range over which the respective colours of the security device are easily viewable to the authenticator. For example, if the elastic photonic crystal material exhibits a red to green colourshift on tilting the switch from red to green occurs closer to normal incidence for the region with the scattering layer compared to one without a scattering layer.

Figure 12:
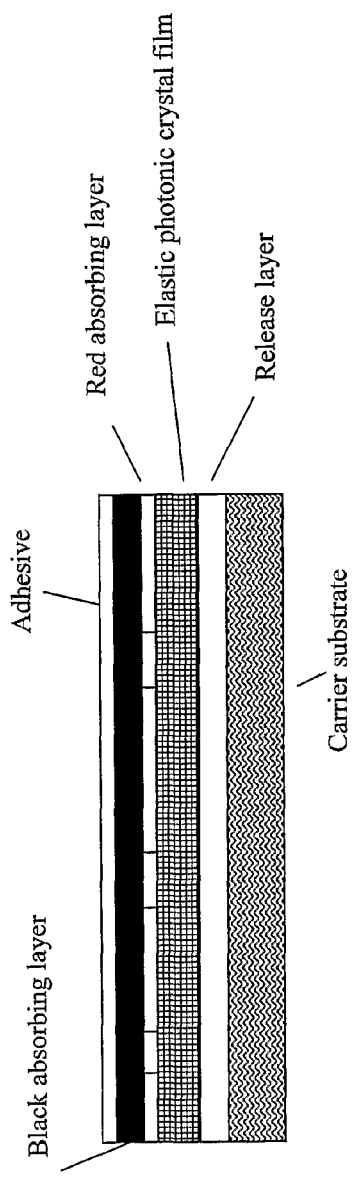
FIG. 12 shows a thirteenth example security device having red and black absorbing layers.
Figure 13:
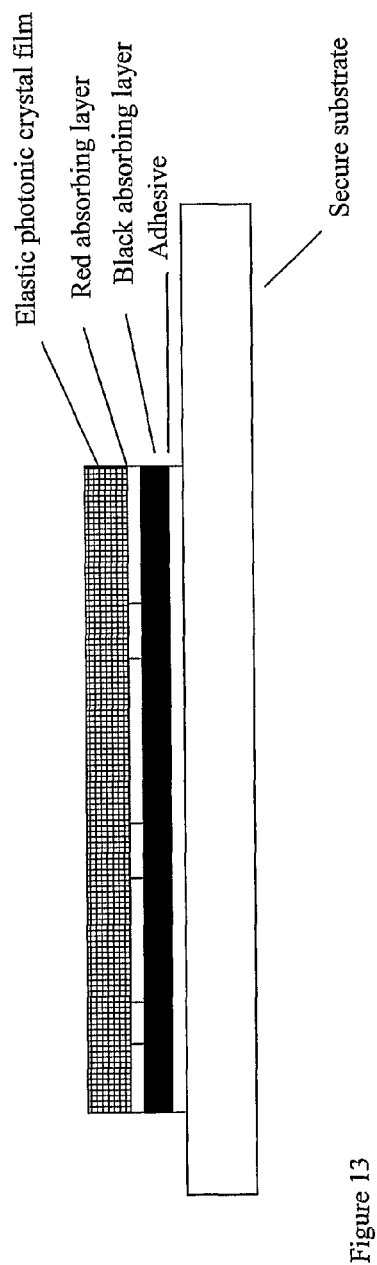
FIG. 13 shows the thirteenth example security device applied to a document.

A further way of customising the security device is to use two or more different coloured absorbing layers. An example of this embodiment is illustrated in FIGS. 12 and 13. FIG. 12 shows a cross-sectional view of a construction of the security device suitable for application as a surface stripe or patch. The device comprises a carrier substrate, which may be coated with a release layer, onto which is applied an elastic photonic crystal film. A red partial absorbing layer is applied over the elastic photonic crystal film in the form of a design and a second black absorbing layer is applied over all of the partial absorbing layer. An adhesive layer is applied to the black absorbing layer. The device is then transferred to a security document, such as a banknote (FIG. 13). After transfer the carrier strip can be removed, leaving the elastic photonic crystal film exposed or alternatively the carrier layer can be left in place to form an outer protective layer. By selection of appropriate colours for the partial absorbing layer the designs defined by this layer can be visible at certain angles of view or states of deformation and invisible at others. In this example the elastic photonic crystal film transmits all wavelengths except red at normal incidence. Then, at normal incidence, the design formed by the red partial absorbing layer is invisible with the device appearing a uniform red colour, but on tilting or deforming (for e.g. by pressing or bending) the device a different colourshift is observed for the elastic photonic crystal regions with and without the partial absorbing layer and therefore the designs are revealed. The revealing of the image is in addition to the two different optically variable effects observed with and without the presence of an external stimulus.

Figure 14:
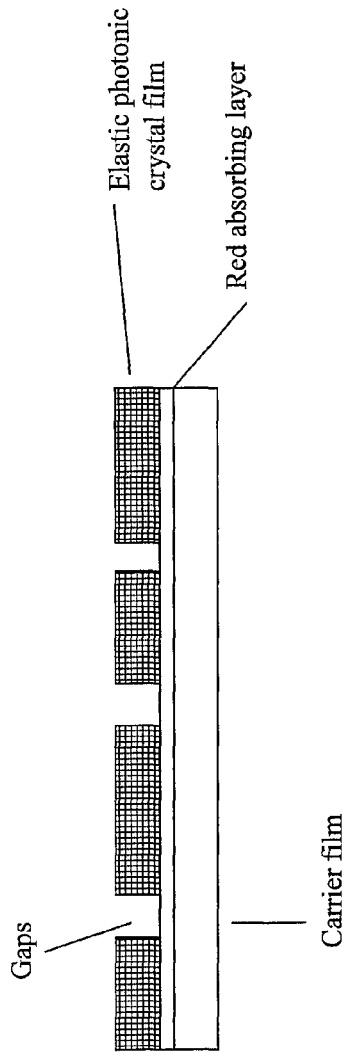
FIG. 14 shows a fourteenth example security device having gaps in the photonic crystal and having an absorbing layer.

In yet a further embodiment of the present invention, the elastic photonic crystal film can be customised by providing gaps in the film such that in localised regions the underlying layer is visible. The gaps can be provided by transferring or coating the elastic photonic crystal film onto a carrier substrate in a partial manner. Alternatively the gaps can be created at later stage in the process for example by laser ablating a fully formed elastic photonic crystal film. FIG. 14 illustrates a device comprising a carrier substrate over which has been applied a red partial absorbing layer onto which has been transferred an elastic photonic crystal film. A laser is used to form gaps in the elastic photonic crystal film in the form of an identifying image. In this example the elastic photonic crystal film transmits all wavelengths except red at normal incidence. Then, at normal incidence, both the gaps and the elastic photonic crystal film appear red and therefore the identifying information defined by the gaps is not distinguishable from the background. On deforming the device the photonic crystal film switches from red to green but the gaps which expose the underlying absorbing layer still appear red, In this manner the identifying image is made to appear by tilting or deforming the device. The revealing of the image is in addition to the two different optically variable effects observed with and without the presence of an external stimulus.

Figure 15:
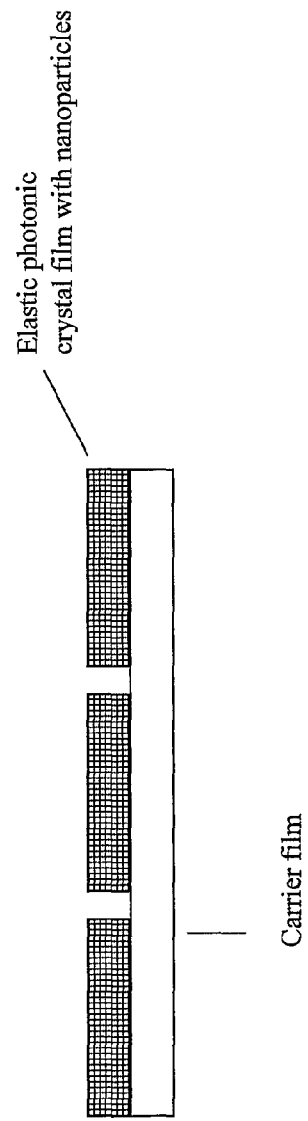
FIG. 15 shows a fifteenth example security device containing nanoparticles.

FIG. 15 illustrates a further example where there are gaps present in the elastic photonic crystal film. The device in FIG. 15 comprises an elastic photonic crystal film which has been transferred onto a substantially transparent carrier substrate. Alternatively a self-supporting elastic photonic crystal film can be used without the need for a carrier substrate. The elastic photonic crystal film is the same as that described in relation to FIG. 9 and carbon nanoparticles have been incorporated into the photonic crystal structure to produce a substantially opaque film with an intense red colour when viewed at normal incidence without the application of an external stimulus. A laser is used to form gaps in the elastic photonic crystal film in the form of an identifying image. The identifying image is clearly visible from both sides, especially in transmitted light due to the contrast between the regions of the substantially opaque elastic photonic crystal film which have been removed and the remaining opaque regions. The security device illustrated in FIG. 15 exhibits two visually contrasting security characteristics; firstly the optical effects of the photonic crystal layer and secondly the identifying image clearly visible in transmission from either side of the device.

In yet a further embodiment of the present invention, photonic crystal materials can be selected such that once the external stimulus is applied the reflected light is in the non-visible wavelengths of the electromagnetic spectrum. The use of elastic photonic crystals where only one component of the colourshift is in the visible region of the electromagnetic spectrum enables an image to be incorporated into the device that only becomes apparent when the external stimulus is applied or removed.

Figure 16:
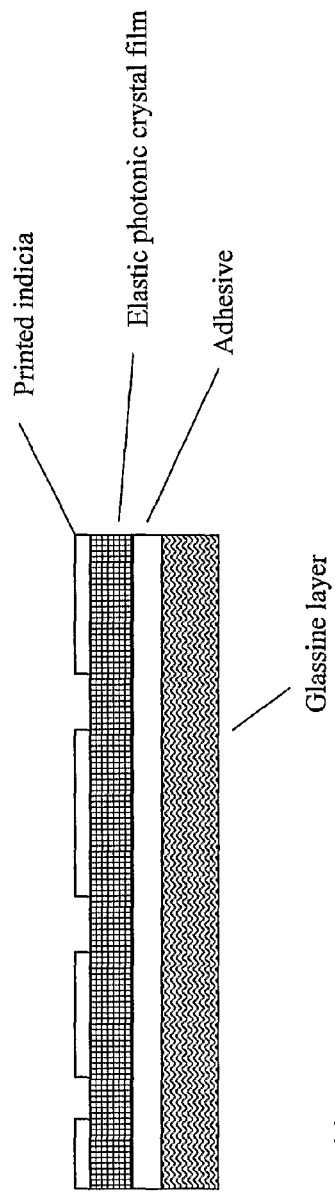
FIG. 16 shows a sixteenth example security device for use as a label.

FIG. 16 shows a cross-sectional view of a further embodiment of the security device of the current invention. The device is intended for use as a security label and comprises an elastic photonic crystal film onto which is printed identifying indicia using inks or dyes. An adhesive layer is applied to one side of the device and over this is applied a glassine carrier layer. The glassine layer allows the label to be easily removed for reapplication to a document, or other item requiring protection.

Figure 17:
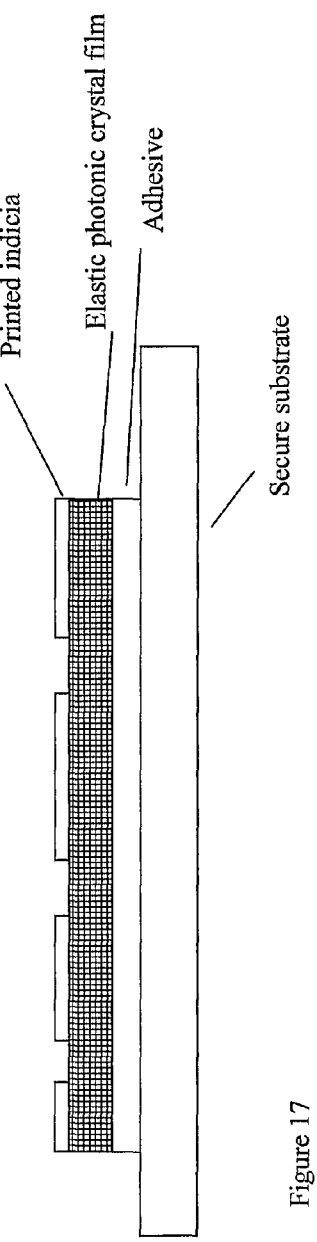
FIG. 17 shows the sixteenth example device attached to a substrate.

FIG. 17 shows the label device applied to a substrate. The glassine layer is first removed to expose the adhesive layer. The label device is then applied to the substrate; the adhesive used may be a pressure sensitive or hot melt adhesive and may be permanent or temporary. The use of temporary adhesives can be of use where a label needs to be removed and reapplied to another article. However, it is more likely that the label must be applied in a permanent manner. To prevent removal and reapplication of a permanently applied label the label may also be provided with other tamper evident features e.g. frangible substrate layers, kiss cuts, and the like.

The elastic photonic crystal film consists of spheres of crosslinked polystyrene in a polyethylacrylate matrix. A polymethylmethacrylate interlayer is present between the spheres and the matrix to ensure compatibility. The elastic photonic crystal material produced exhibits a face-centred-cubic crystalline structure with the (111) plane parallel to the surface of the film. Carbon nanoparticles have been incorporated into the photonic crystal structure such that the film has an intense blue colour when viewed at normal incidence without the application of an external stimulus. The identifying indicia is printed in a blue colour such that when the device is viewed at normal incidence the indicia is not readily apparent against the background colour of the elastic photonic crystal film. On tilting the device, without applying an external stimulus, light reflected by the photonic crystal film changes from blue to invisible ultra violet light and the film will appear black due to the presence of the carbon nanoparticles. As the device is tilted the blue printed identifying indicia are revealed as the background changes from blue to black. On deforming the security device, either by bending, pressing or stretching and viewing at normal incidence, the colour of the device changes from blue to black due to the reflected light changing from blue to invisible ultraviolet light with the black appearance again due to the presence of the carbon nanoparticles. In this manner the blue identifying indicia is revealed on applying the external stimulus. If the device in this example is tilted in its deformed state its appearance in visible light will not change but there will be a change in the wavelength of the light reflected outside the visible range. This change in the wavelength of reflected UV light with viewing angle can provide the device with a machine-readable aspect that is not apparent with the naked eye.

In a further embodiment a photonic crystal film, which in its deformed state reflects light in the non-visible wavelengths of the electromagnetic spectrum, is overprinted or embossed with a first array of fine lines. A second array of fine lines is located underneath the security device, as part of the absorbing layer or an additional printed layer. When the device is deformed the elastic photonic crystal film transmits all visible light and is sufficiently transparent that the first and second array of lines combine to produce a visible moiré pattern, preferably in the form of an identifying image.

Figure 18:
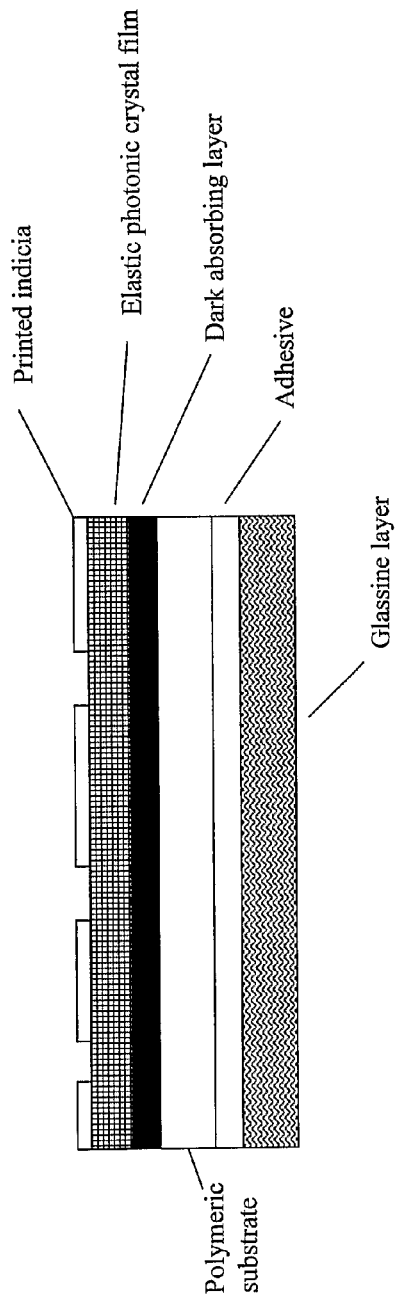
FIG. 18 shows a seventeenth example, analogous to the sixteenth.
Figure 19:
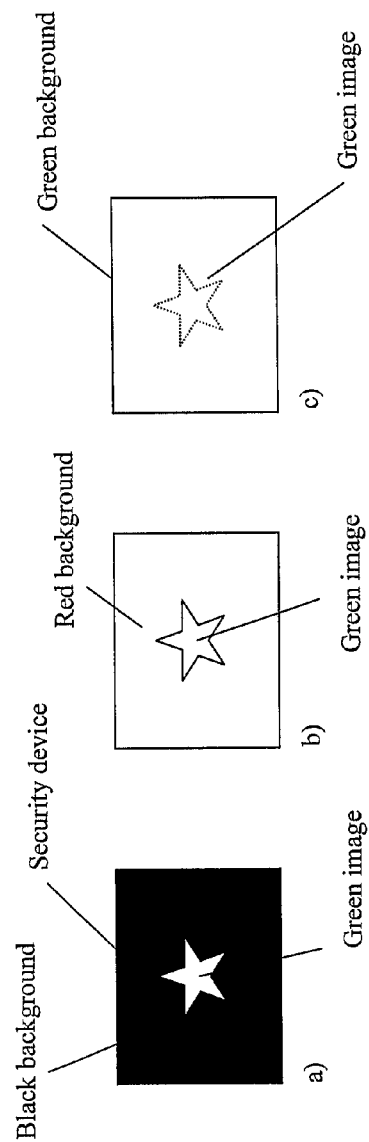

In a modification to the example of FIGS. 16 and 17, illustrated in FIGS. 18 and 19, the elastic photonic crystal film comprises a photonic crystal that solely reflects infrared light when viewed at normal incidence, and reflects visible light when an external stimulus is applied. Prior to the application of an external stimulus the device switches from reflecting infrared light to visible red light as the device is tilted. FIG. 18 is a cross-section of a security device and comprises a polymeric carrier substrate onto which is printed a dark absorbing layer. An elastic photonic crystal film is then transferred onto the absorbing layer and is overprinted with a green identifying image. In this example the photonic crystal is not doped with carbon nanoparticles but the presence of the absorbing layer means that only the reflected wavelengths of light are seen as a colour. An adhesive layer is applied to one side of the device and over this is applied a glassine carrier layer.

FIG. 19 illustrates a plan view of the device. On viewing the device illustrated in FIGS. 18 and 19 at normal incidence, without the application of an external stimulus, the elastic photonic crystal film will appear colourless and therefore the device will take on the black appearance of the underlying absorbing layer. The green identifying image will be visible against a black background (FIG. 19a). On tilting the device, without applying an external stimulus, light reflected by the photonic crystal film changes from invisible infra-red light to visible red light and the security device will switch from black to red with the green identifying image still being observed. On deforming the security device, either by bending, pressing or stretching and viewing at normal incidence, the colour of the device changes initially from black to red, and a green identifying image is observed on a red background (FIG. 19b). As the level of deformation increases there is further contraction of the photonic crystal lattice perpendicular to the plane of the substrate, and the observed colour moves to a shorter wavelength and the device appears green. Throughout the deformation process the colour of the identifying image remains constant, i.e. green, and therefore as the authenticator deforms the sample he/she observes a green image firstly on a black background (FIG. 19a) and then a red background (FIG. 19b) and then the green image is seen to disappear into a uniform green background (FIG. 19c). In this manner a highly interactive security feature is created which is both striking and memorable to the authenticator.

Figure 20:
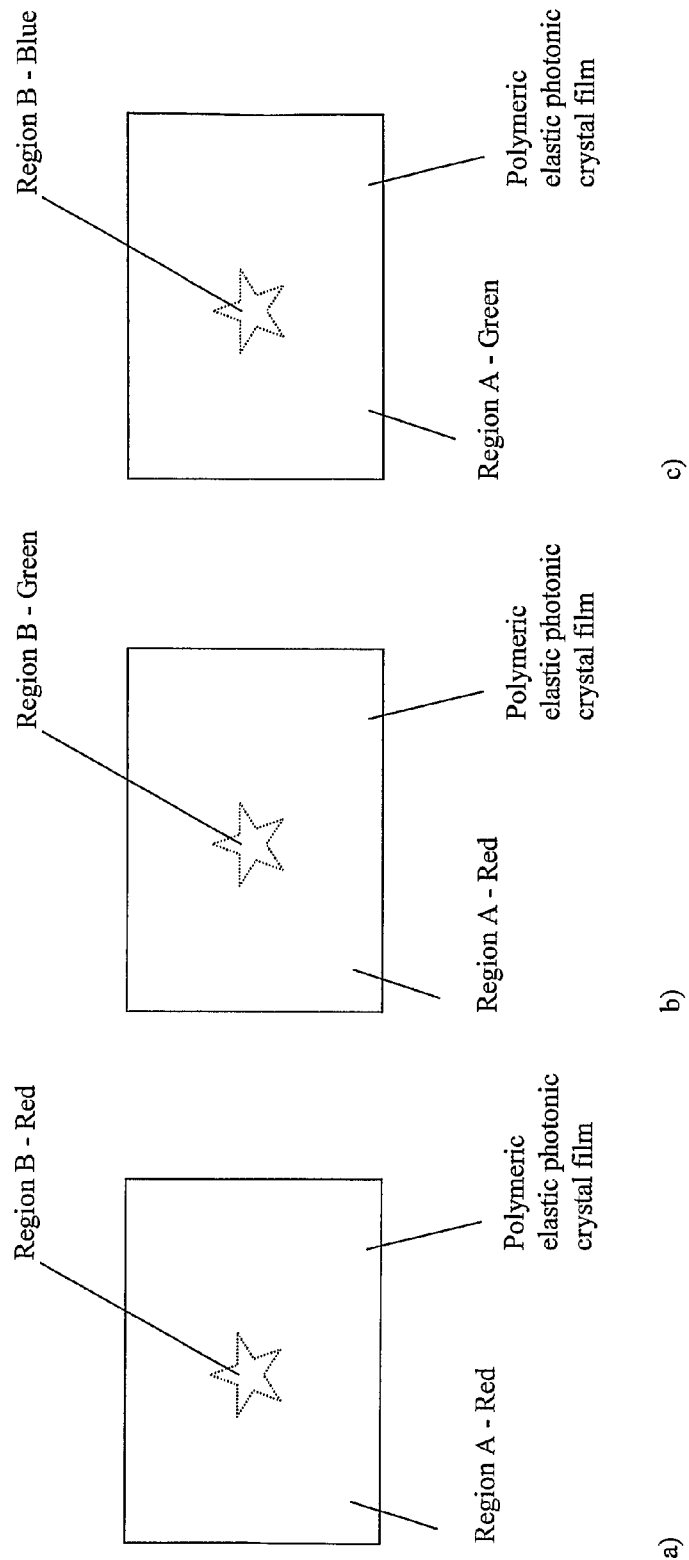

In a further embodiment of the current invention the mechanical properties of the elastic photonic crystal film can be varied in localised regions such that the degree of contraction in the crystal lattice spacing perpendicular to the plane of the security device is varied across the device. This results in laterally spaced regions which exhibit different colourshift effects when the device is deformed. The variation in mechanical properties can take the form of a local variation in the stiffness of a polymeric elastic photonic crystal film, which can be achieved, for example, by varying the cross-link density across the elastic photonic crystal film. Areas with a high cross-link density will require higher deformation to achieve the same colourshift compared to those areas with a low cross-link density. In the example in FIG. 20 the polymeric elastic photonic crystal film comprises regions A and B. Region A has a higher cross-link density than region B. On viewing the device illustrated in FIG. 20 at normal incidence and without the application of an external stimulus, both regions A and B of the elastic photonic crystal film will appear a uniform red colour (FIG. 20a). On initially deforming the elastic photonic crystal film region A, with a high stiffness due to a high cross-link density, will remain red due to a negligible contraction in the crystal lattice spacing. Region B which is less stiff, due to a lower cross-link density, will switch from red to green due to a significant contraction in the crystal lattice spacing and will revel the image of a green star (FIG. 20b). If the level of deformation is increased region A will eventually switch from red to green and region B will switch from green to blue (FIG. 20c). At all points in it deformed state both regions A and B will also exhibit an angular dependent colourshift.

In an alternative embodiment to that discussed in relation to FIG. 20 the variation in the mechanical properties can be achieved by locally varying the thickness of the elastic photonic crystal film. Thinner regions of the elastic photonic crystal film will be easier to deform than thicker regions and therefore will switch colour at lower levels of deformation. Local variations in thickness can be easily provided if the elastic photonic crystal film is formed by a coating process. Alternatively regions of reduced thickness can be provided by embossing.

In all of the examples the designs or identifying images created by any of the layers, for example the photonic crystal film, the absorbing layers or customising layers, can take any form. Preferably the designs are in the form of images such as patterns, symbols and alphanumeric characters and combinations thereof. The designs can be defined by patterns comprising solid or discontinuous regions which may include for example line patterns, fine filigree line patterns, dot structures and geometric patterns. Possible characters include those from non-Roman scripts of which examples include but are not limited to, Chinese, Japanese, Sanskrit and Arabic.

The invention claimed is:

1. An optically variable security device comprising:
a photonic crystal that, upon receipt of incident light, is configured to generate a first optical effect, and when the optically variable security device is subjected to an external stimulus, the photonic crystal is configured to generate a second optical effect that is different from the first optical effect, wherein
at least one of the first and second optical effects is an optically variable effect observable over a set of directions and caused by the incident light being selectively reflected or transmitted by the photonic crystal,
following removal of the external stimulus, an observable optical effect of the external stimulus upon the photonic crystal remains for a delay period as the photonic crystal reverts from the second optical effect to the first optical effect over the delay period, and
the photonic crystal is provided as a self-supporting film or the photonic crystal is supported by a substrate or carrier layer.

2. The optically variable security device according to claim 1, wherein the first and second optical effects comprise first and second optically variable effects respectively.

3. The optically variable security device according to claim 2, wherein the second optically variable effect is observable over the set of directions.

4. The optically variable security device according to claim 2, wherein, when the optically variable security device is illuminated with a white light source, the first and second optically variable effects are colour effects.

5. The optically variable security device according to claim 2, wherein the first optically variable effect is a first angularly dependent colour effect and the second optically variable effect is a second angularly dependent colour effect that is different from the first angularly dependent colour effect.

6. The optically variable security device according to claim 1, wherein the first optical effect and the second optical effect are reflective effects.

7. The optically variable security device according to claim 1, wherein the optically variable security device is arranged such that the first optical effect and second optical effect are visible to a naked eye of a human observer.

8. The optically variable security device according to claim 1, wherein each of the first optical effect and the second optical effect is dependent upon a photonic crystal orientation with respect to the incident light.

9. The optically variable security device according to claim 1, wherein each of the first optical effect and the second optical effect is a function of a viewing angle with respect to the photonic crystal.

10. The optically variable security device according to claim 1, wherein a part of at least one of the first optical effect and the second optical effect is in the infra-red or ultra-violet part of the electromagnetic spectrum.

11. The optically variable security device according to claim 1, wherein the photonic crystal comprises a quasi-crystal.

12. The optically variable security device according to claim 1, wherein the external stimulus is one or more of a mechanical, thermal, chemical, electrical, magnetic, electromagnetic or ultrasonic stimulus.

13. The optically variable security device according to claim 1, wherein an application of the external stimulus causes a modification in a periodic spacing of one or more refractive entities within a crystal structure of the photonic crystal.

14. The optically variable security device according to claim 1, wherein an application of the external stimulus causes a modification in a refractive index of one or more refractive entities within a crystal structure of the photonic crystal.

15. The optically variable security device according to claim 1, wherein the photonic crystal is arranged such that an effect of the external stimulus upon the photonic crystal is reversible upon removal of the external stimulus or upon application of an opposite stimulus.

16. The optically variable security device according to claim 1, wherein the photonic crystal comprises an elastomeric component such that the external stimulus can be applied by an application of a force to the optically variable security device.

17. The optically variable security device according to claim 1, wherein the incident light is one or more of ultra-violet, visible or infra-red light.

18. The optically variable security device according to claim 1, wherein the photonic crystal is formed from spheres of a first material and a matrix of a second material, each of the first material and the second material having a different respective refractive index.

19. The optically variable security device according to claim 1, wherein the photonic crystal has structure parameters that are different at different positions within the photonic crystal so as to produce different corresponding optical properties.

20. The optically variable security device according to claim 1, wherein the photonic crystal is formed from two or more crystal structures having different optically variable properties.

21. The optically variable security device according to claim 1, wherein the photonic crystal is provided as a self-supporting film.

22. The optically variable security device according to claim 1, wherein the photonic crystal is supported by a substrate or carrier layer.

23. The optically variable security device according to claim 22, wherein the substrate or carrier layer is a polymeric layer.

24. The optically variable security device according to claim 1, wherein
the optically variable security device includes at least one outer surface; and
an adhesive layer is provided upon the at least one outer surface of the optically variable security device.

25. The optically variable security device according to claim 1, further comprising a scattering layer.

26. The optically variable security device according to claim 1, further comprising an optically absorbent material provided as one or more layers applied to the optically variable security device.

27. The optically variable security device according to claim 26, wherein the optically absorbent material is selectively absorbent at light wavelengths.

28. The optically variable security device according to claim 26, wherein the optically absorbent material is an ink or dye.

29. The optically variable security device according to claim 1, wherein the optically variable security device further comprises a metallised layer.

30. The optically variable security device according to claim 29, wherein the metallised layer is selectively demetallised at a number of locations.

31. The optically variable security device according to claim 29, wherein the optically variable security device further comprises a layer of resist upon the metallised layer.

32. The optically variable security device according to claim 31, wherein the metallised layer or the layer of resist is arranged as indicia.

33. The optically variable security device according to claim 1, wherein the optically variable security device is arranged to be machine-readable.

34. The optically variable security device according to claim 33, wherein the optically variable security device further comprises at least one layer of a machine-readable material or the photonic crystal further comprises a machine-readable material.

35. The optically variable security device according to claim 34, wherein the machine-readable material is a magnetic material.

36. The optically variable security device according to claim 34, wherein the machine-readable material comprises a material which is responsive to the external stimulus.

37. The optically variable security device according to claim 34, wherein the machine-readable layer is transparent.

38. The optically variable security device according to claim 33, wherein the optically variable security device further comprises a separate layer containing a machine-readable material.

39. The optically variable security device according to claim 1, further comprising an optically absorbent material formed within a crystal structure of the photonic crystal.

40. The optically variable security device according to claim 1, further comprising nanoparticles within a crystal structure of the photonic crystal.

41. The optically variable security device according to claim 40, wherein the photonic crystal further comprises nanoparticles distributed uniformly through the photonic crystal such that the photonic crystal exhibits at least one of the first optical effect and the second optical effect the same in each part of the photonic crystal.

42. The optically variable security device according to claim 40, wherein the photonic crystal further comprises nanoparticles distributed inhomogeneously through the photonic crystal such that the photonic crystal exhibits at least one of the first optical effect and the second optical effect differently in different parts of the photonic crystal.

43. The optically variable security device according to claim 42, wherein the nanoparticles are distributed in a number of regions having different concentrations.

44. The optically variable security device according to claim 40, wherein the nanoparticles are distributed according to a concentration gradient.

45. The optically variable security device according to claim 40, wherein the nanoparticles are carbon nanoparticles.

46. The optically variable security device according to claim 1, wherein the optically variable security device is arranged to produce a latent image which is selectively visible according to a viewing angle.

47. The optically variable security device according to claim 1, wherein a surface of the photonic crystal is embossed with raised structures.

48. The optically variable security device according to claim 1, wherein a surface of the photonic crystal device is overprinted.

49. The optically variable security device according to claim 1, wherein the optically variable security device further comprises a hologram.

50. The optically variable security device according to claim 1, wherein the photonic crystal is an elastic photonic crystal.

51. The optically variable security device according to claim 50, wherein the mechanical properties of the elastic photonic crystal are arranged to be different in respective localised regions.

52. The optically variable security device according to claim 1, wherein the photonic crystal is provided as a polymeric film.

53. The optically variable security device according to claim 1, comprising photoluminescent particles whose lifetime is affected by the external stimulus.

54. A security document comprising an optically variable security device according to claim 1, wherein the optically variable security device is adhered to or contained within the security document.

55. The security document according to claim 54, wherein the optically variable security device is embedded within a document window so as to provide crystal surfaces for receiving incident light on each of opposing faces of the document.

56. The security document according to claim 54, wherein the optically variable security device is overlaid upon, applied to or forms part of an additional security feature.

57. The security document according to claim 54, wherein the optically variable security device is supported upon a transparent layer.

58. The security document according to claim 54, wherein the optically variable security device is provided as a projection such that it or a part attached to the optically variable security device may be grasped by a user and elastically deformed so as to apply the external stimulus.

59. The security document according to claim 54, wherein the optically variable security device is provided in a form selected from the group consisting of a security thread, a security fibre, a security patch, a security strip, a security stripe and a security foil.

60. The security document according to claim 54, wherein the security document is a bank note.

61. An optically variable security device comprising:
a photonic crystal that, upon receipt of incident light, is configured to generate a first optical effect, and when the optically variable security device is subjected to an external stimulus in the form of applied pressure, the photonic crystal is configured to generate a second optical effect that is different from the first optical effect, wherein
at least one of the first and second optical effects is an optically variable effect observable over a set of directions and caused by the incident light being selectively reflected or transmitted by the photonic crystal,
the applied pressure, when applied to a surface of the optically variable security device, causes the photonic crystal to deform from a first configuration in which the the first optical effect is observable to a second configuration in which the second optical effect is observable, and
the photonic crystal is provided as a self-supporting film or the photonic crystal is supported by a substrate or carrier layer.

62. An optically variable security device comprising:
a photonic crystal that, upon receipt of incident light, is configured to generate a first optical effect, and when the optically variable security device is subjected to an external stimulus that is at least one of: thermal, chemical, electrical, magnetic, electromagnetic or ultrasonic stimuli, the photonic crystal is configured to generate a second optical effect that is different from the first optical effect, wherein
at least one of the first and second optical effects is an optically variable effect observable over a set of directions, which is a function of a viewing angle with respect to the photonic crystal and is caused by the incident light being selectively reflected or transmitted by the photonic crystal, and
the photonic crystal is provided as a self-supporting film or the photonic crystal is supported by a substrate or carrier layer.

* * * * *